(12) United States Patent
Sen et al.

(10) Patent No.: US 11,586,619 B2
(45) Date of Patent: *Feb. 21, 2023

(54) NATURAL LANGUAGE ANALYTICS QUERIES

(71) Applicant: International Business Machines Corporation, Armonk, NY (US)

(72) Inventors: Jaydeep Sen, Bangalore (IN); Karthik Sankaranarayanan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 198 days.

This patent is subject to a terminal disclaimer.

(21) Appl. No.: 17/130,482

(22) Filed: Dec. 22, 2020

(65) Prior Publication Data

US 2021/0149888 A1 May 20, 2021

Related U.S. Application Data

(63) Continuation of application No. 16/120,921, filed on Sep. 4, 2018, now Pat. No. 10,901,986.

(51) Int. Cl.
*G06F 16/242* (2019.01)
*G06F 16/28* (2019.01)
*G06F 16/2455* (2019.01)

(52) U.S. Cl.
CPC ........ *G06F 16/243* (2019.01); *G06F 16/2455* (2019.01); *G06F 16/285* (2019.01)

(58) Field of Classification Search
None
See application file for complete search history.

(56) References Cited

U.S. PATENT DOCUMENTS

| 2016/0171050 A1 | 6/2016 | Das |
| 2016/0232537 A1 | 8/2016 | Nonez et al. |
| 2018/0060297 A1 | 3/2018 | Wegryn et al. |

FOREIGN PATENT DOCUMENTS

WO   2013115985 A2   8/2013

OTHER PUBLICATIONS

List of IBM Patents or Patent Applications Treated as Related.
(Continued)

*Primary Examiner* — Amresh Singh
(74) *Attorney, Agent, or Firm* — Ryan, Mason & Lewis, LLP

(57) ABSTRACT

Methods, systems, and computer program products for processing natural language analytics queries are provided herein. A computer-implemented method includes obtaining a natural language query comprising an analytics function; applying domain reasoning using a predefined grammar for a plurality of different predefined categories of analytics functions to assign the analytics function of the natural language query into a given analytics function category; identifying predefined arguments and a predefined sequence of actions associated with the given analytics function category; instantiating the analytics function using the predefined arguments and the predefined sequence of actions; interpreting the instantiated analytics function in the context of a domain ontology to generate a target executable query to implement the instantiated analytics function; and executing the predefined sequence of actions for the given analytics function class on a result of the target executable query to obtain an answer to the natural language query.

20 Claims, 24 Drawing Sheets

(56) References Cited

OTHER PUBLICATIONS

Song et al.. Natural Language Question Answering and Analytics for Diverse and Interlinked Datasets, 2015 Conference of the North American Chapter of the Association for Computational Linguistics: Human Language Technologies, pp. 101-105 (2015).
Wikipedia, Athena Framework, https://en.wikipedia.org/w/index.php?title=Athena Framework&oldid=841720594, May 17, 2018.
Li et al., NaLIR: An Interactive Natural Language Interface for Querying Relational Databases, SIGMOD'14, Jun. 22-27, 2014.
Dautrich Jr. et al., Compromising Privacy in Precise Query Protocols, EDBT/ICDT '13 Mar. 18-22, 2013.
Yaghmazadeh et al., SQLizer: Query Synthesis from Natural Language, Proc. ACM Program. Lang., vol. 1, No. 1, Article 1. Publication date: Jan. 2017.
Wikipedia, Watson (computer), https://en.wikipedia.org/w/index.php?title=Watson_(computer)&oldid=850822192, Jul. 18, 2018.
Wikipedia, Power BI, https://en.wikipedia.org/w/index.php?title=Power_BI&oldid=853919600, Aug. 7, 2018.

Analytics Functions Classes 300

Percentage Operations Class 310-1:
- % share - Computing fraction of contribution in percentage
- % increase - Computing percentage increase relative to a reference value (can be from a query)
- % decrease - Computing percentage decrease relative to a reference value (can be from a query)
- % change - Computing percentage difference relative to a reference value (can be from a query)

Growth/Decline/Difference Relative to Reference Time Frame Class 310-2:
- Yearly/Monthly/Weekly/Daily growth - Computing growth relative to a reference time frame
- Yearly/Monthly/Weekly/Daily decline - Computing decline relative to a reference time frame
- Yearly/Monthly/Weekly/Daily change - Computing change relative to a reference time frame

Difference Between Two Measurable Values Class 310-3:
- Difference Between Measure1 and Measure2
- Difference Between Measure in time1 and time2

Compare Measure Between Two Entities Class 310-4:
- Provide both values side by side.

Statistical Functions Class 310-5:
- Range/Median/Variance of numeric values

Chained Combination Class 310-6 of 310-1 Through 310-4:
- Difference in % share, Compare growth etc.

FIG. 3

Domain Examples 400

| Case 410 | Finance 420 | Healthcare 430 | Retail 440 |
|---|---|---|---|
| Percentage Computation 410-1 | 1. What is % share of revenues Amazon generated in 2018 in e-commerce industry? 2. What is the % change of net profit for Microsoft in this quarter? | 1. What % of insurance customers are from EU? 2. What is the % decrease in insurance payouts by Star Health in 2018 | 1. What % of Net sales is generated by Apparels in 2018? 2. What is the % increase in gross sales for Peter England in Karnataka in 2018? |
| Growth /Decline 410-2 | 1. What is the growth of revenues for IBM in this quarter? | 1. What is the growth in number of insurance enrollments this year? | 1. How much the gross sales of Peter England has grown in last two quarters? |
| Difference 410-3 | How much is the difference between revenues and gross profit for IBM this year? | How much is the difference between enrollment pay ins and payouts for Star Healthcare this year? | What is the difference between gross sales and net sales for Allen Solly in last 2 months? |
| Compare 410-4 | Compare the revenue numbers between Microsoft and IBM in last 5 years? | Compare the number of enrollments and exits for Star Healthcare in 2018? | Compare the GSV generated by Van Huessen in Nov 2018 with 2017? |
| Statistical Functions 410-5 | What is the variance of profits generated by Alphabet in last 3 years? | What is median amount of sum insured availed by enrollments in Star Health? | What is the range of MRPs offered by Van Huessen products in Bangalore? |
| Combination 410-6 | Which company had the maximum revenues growth in 2018? | What is the growth of average sum insured opted for enrollments to Star Health? | Compare the Net sales growth for Allen Solly with Peter England? |

FIG. 4

Analytics Function (AxF) – Exemplary Handling 700

| AxF Category | Arguments | Action |
|---|---|---|
| % share | • ofEntity(E)- Entity<br>• onNumericEntity(NE) | • v1: Compute the value of NE for E w/o considering any percentage action<br>• v2: Compute the value of NE without any filter for E<br>• Return v1*100/v2; |
| % increase, % decrease, % change | • onEntity(NE)<br>• Reference Time(RT)<br>RT – Reasoned over the ontology and the query filters<br>e.g., weekly, monthly, yearly etc. | • v1: compute the query for each possible refTime within query filters and previous.<br>• v2. for each refTime do,<br>((v1 at refTime - v1 at refTime-1)/v1 at refTime-1)*100 |
| growth, decline, change | • onEntity(NE)<br>• Reference Time(RT)<br>RT – Reasoned over the ontology and the query filters<br>e.g., weekly, monthly, yearly etc. | • vT: compute the query for each possible refTime within query filters and previous.<br>• for each refTime do,<br>$((v_T - v_{T-1} \text{ at refTime-1})/v_{T-1})$ |

FIG. 7A

Analytics Function (AxF) – Exemplary Handling 700 (cont'd)

| AxF Category | Arguments | Action |
|---|---|---|
| difference | - onNumericEntity(NE)<br>- ofEntity1(E1)<br>- ofEntity2(E2)<br>- fromTime(t1)<br>- toTime(t2) | If(E1 is present && E2 is present)<br>- V1- Compute NE for E1<br>- V2- Compute BE for E2<br>- Return V1-V2;<br><br>If(T1 is present && T2 is present)<br>- V1- Compute NE for T1<br>- V2- Compute NE for T2<br>- Return V1-V2; |
| compare | - Between Entities (E1,E2,...Em)<br>- Between Timeframes(fromT, toT)<br>- onNumericEntity(NE) | If(multiple Es)<br>- Compute N for the query for each E<br>- Return one row for Each E<br><br>If(multiple Ts)<br>- Compute N for the query for each T<br>- Return one row for Each T |
| Statistical Functions | - onNumericEntity(NE)<br>- Function: f | - Compute NE for the query<br>- Consider value of NE for each row as a data point<br>- Compute f over the data points |

FIG. 7B

Walk Through Examples 800

| AxF Category (710) | Arguments (720) | Action (730) |
|---|---|---|
| What is the % share of revenues generated by Apparel? | onNE= revenues ofE= Apparel | • v1: Compute the value of N for E1 w/o considering any percentage action<br>• v2: Compute the value of N without any filter for E1<br>• Return v1*100/v2;<br><br>↑ V1 = Revenues generated by apparel<br>V2 = Revenues generated in total<br>return v1*100/v2 |
| Compare the GSV generated by stores in Karnataka between Jan to Feb this year with last year | T1 = Jan to Feb 2018<br>T2 = Jan to Feb 2017<br>ofNumericEntity= GSV | If(multiple Ts)<br>• Compute N for the query for each T<br>• Return one row for Each T<br><br>↑ V1 = Compute GSV for each store in T1<br>V2 = Compute GSV for each store in T2<br>Return -> for each store (v1,v2) |
| What is the growth in net sales for Peter England between October to December 2017? | onE=net sales<br>Reference Time Frame = monthly | • v$_i$: compute the query for each possible refTime within query filters and previous.<br>• for each refTime do,<br>$((v_T - v_{T-1} \text{ at refTime-1})/v_{T-1}))$<br><br>↑ $V_1, V_2, V_3, V_4$ = Compute NSV for Sep, Oct, Nov, Dec.<br>Return : (V1-V2)/V1, (V2-V3)/V2, (V3-V4)/V4. |

FIG. 8

Analytics Query Classes 1000

Rank Query Class 1010-1

Pattern Query Class 1010-2

Distribution Query Class 1010-3

FIG. 10

Natural Language Analytics (NLAx) Examples 1100

| Example 1110: What are Employment Numbers in Software Industry in USA?<br>Analytics Intents 1115 | NLAx Query Views 1110 |
|---|---|
| – Find Top K Recruiters in Software Industry<br>--> Rank Companies by their Number of Employees<br>--> Find Top K Companies with Highest Employee Counts | Rank View 1110-1 |
| – How Total Employee Numbers in Software Industry has Increased/Decreased in Last 10 Years<br>--> Find Total Number of Employees Working in Software Industries for Each Year<br>--- Plot This Number Against Each Year | Pattern View 1110-2 |
| – Number of Companies of Different Size (in Employee Counts)<br>--- Estimate Size of Company in Terms of Employee Count in intervals of 0-1000, 1000-5000, 5000 and more.<br>--- Count Number of Companies in Each Interval<br>--- Distribution View in NLAx | Distribution View 1110-3 |
| Example 1120: How Much Time Do Doctors Spend with Patients?<br>Analytics Intents 1125 | |
| – Find Top K Doctors Who Spend Most Time per Patient in Each Year<br>--- For Each Doctor Find Average Time Spent per Patient for Each Year<br>--- Rank Doctors by Average Time Spent for Each Year | Rank View 1110-1 |
| – How Average Time Spent per Patient has Changed in Last 10 Years<br>--- Find the average time spent by doctors per patient for each year<br>--- Plot average time spent per year for last 10 years | Pattern View 1110-2 |
| – Number of Doctors in Different Intervals of Time Spent<br>--- For Each Doctor, Find Average Time Spent With Patient<br>--- Count Number of Doctors by Their Average Spent Time in Intervals of 0-10 Mins, 10-30 Mins, 30 Mins-1 Hr, 1 Hr and More | Distribution View 1110-3 |

FIG. 11

Domain Examples 1200

| 1210<br>Analytics Intents | 1220<br>Retail<br>How are Revenue Numbers for Retail Industry in USA? | 1230<br>Healthcare<br>How Much Time do Doctors Spend With Patients? |
|---|---|---|
| 1210-1<br>Top Entities Ranked by Some Measurable Numeric Quantity | 1220-1<br>Top Retailers | 1230-1<br>Top Doctors by most spent time |
| 1210-2<br>How Measurable Numeric Quantity has Increased /Decreased Over Time Period | 1220-2<br>Change of Revenue Numbers per year | 1230-2<br>AVG TIME SPENT BY DOCTORS BY YEAR |
| 1210-3<br>Distribution of entities across different segment of values of some numeric quantity | 1220-3<br>Number of Retailers in Different Revenue Segments | 1230-3<br>% of Doctors in different |

FIG. 12

NLAx Technical Design 1300: Exemplary Target Views

- Analytic Queries
- Pattern View Query 1310: Query asking about finding a pattern among "similar numbers" computed across a set of variable parameters:
    - Compute - [Aggregation | PointValue] P
    - Filter(Optional) -> (P->filters)
    - Variable Parameters (P ->params)
- Rank View Query 1320: Query asking about ranking a set of entities based on some score to be computed:
    - Rank - Entities E
    - Filter(optional) : E->Filters
    - Score : [Aggregation|PointValue] (E->prop)
    - Score Comparison Function(Optional) : Scaling_function(Score)
    - Repeat: For each value of Properties P1, ...Pm.
- Distribution View Query 1330: Query asking about distribution of certain entities across computed intervals
    - Interval - Property P
    - Filter(Optional) : P->filters
    - Count : P-> Es
    - Repeat: For each value of Properties P1, ...Pm.

FIG. 13

| Example Query 2010 | Domain Reasoning/Data Analysis 2020 | Class Parameters 2030 |
|---|---|---|
| 2010-1: How has Apple's stock performed under Tim Cook as compared to its competitors? | Relation Between Company and Executive has a Temporal Association "under Tim Cook" Refers to a Temporal Field | Pattern Query PointValue(Stock.value) Filter: Apple, Tim Cook, Time duration for Tim Cook Apple's Competitor Variable: Stock.Year, Stock.Company Implicit: Tim Cook's duration as the variable time points |
| 2010-2: In which countries are most groceries bought online? | "Grocery" is Related With a Measurable Quantity "Price" | Rank Query Rank(Country C) Filter: Grocery, Online Score: Sum(C.Price) Score Comparison Function: % Repeat: None Implicit Inference: Sum on Price |
| 2010-3: How much time do primary care physicians spend with patients as of 2017? | "Time" is a Measurable Quantity. Data Analysis can Reveal How to Bucketize the Time Values | Distribution Query Interval (Spent Time) Filter: Primary Care Physician, 2017 Count: Spent Time->Doctors Repeat: None |

FIG. 20

NATURAL LANGUAGE ANALYTICS QUERIES

FIELD

The present application generally relates to information technology, and, more particularly, to the processing of natural language queries.

BACKGROUND

A natural language query comprises terms in a native language of a user, without requiring a special syntax or a particular format. A natural language query may be entered in any form, such as a statement, a question, or a list of keywords. A keyword query, for example, comprises terms entered by the user that are used to retrieve documents having some or all of the specified terms.

An analytic function is a function that is given locally by a convergent power series. Analytic functions are an important aspect of mathematical analysis. Existing natural language query systems can process point queries and queries comprising an aggregation function. Existing natural language query systems, however, are unable to process queries having an analytic intent.

A need therefore exists for improved techniques for processing natural language analytics queries.

SUMMARY

In one embodiment of the present invention, techniques for processing natural language analytics queries are provided. An exemplary computer-implemented method can include steps of obtaining a natural language query comprising at least one analytics function; applying domain reasoning using a predefined grammar for a plurality of different predefined categories of analytics functions to assign the at least one analytics function of the natural language query into a given analytics function category; identifying one or more predefined arguments and a predefined sequence of actions associated with the given analytics function category; instantiating the at least one analytics function using the one or more predefined arguments and the predefined sequence of actions; interpreting the instantiated at least one analytics function in the context of a domain ontology to generate a target executable query to implement the instantiated at least one analytics function; and executing the predefined sequence of actions for the given analytics function class on a result of the target executable query to obtain an answer to the natural language query.

In another embodiment of the invention, an exemplary computer-implemented method can include steps of obtaining a natural language query comprising one or more of a point query and a keyword query; applying domain reasoning using a predefined grammar for a plurality of different predefined analytics query classes to assign the natural language query into at least one of the plurality of predefined analytics query classes; identifying one or more predefined arguments associated with the at least one predefined analytics query class; applying domain reasoning for the at least one predefined analytics query class to identify one or more implicit parameters to instantiate the at least one predefined analytics query class using the one or more predefined arguments; interpreting the instantiated at least one predefined analytics query class in the context of a domain ontology to generate a target executable query to implement the instantiated at least one predefined analytics query class; and executing the target executable query to obtain an answer to the natural language query.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 illustrates an exemplary set of analytics function classes according to some embodiments of the invention;

FIG. 4 illustrates an exemplary set of domain examples according to an embodiment of the invention;

FIGS. 7A and 7B, collectively, illustrate an exemplary handling of an analytics function according to some embodiments of the invention;

FIG. 8 illustrates an exemplary set of additional domain examples according to one embodiment of the invention;

FIG. 10 illustrates an exemplary set of analytics query classes according to some embodiments of the invention;

FIGS. 11 and 12 illustrate exemplary sets of domain examples according to some embodiments of the invention;

FIG. 13 illustrates an exemplary technical design comprising exemplary target views for various analytics queries according to an embodiment of the invention;

FIG. 20 illustrates an exemplary set of additional domain examples according to one embodiment of the invention;

DETAILED DESCRIPTION

As described herein, an embodiment of the present invention provides techniques for processing natural language queries comprising an express or implied analytics intent. For example, one or more embodiments of the invention process natural language queries comprising at least one express analytics function. In further variations, natural language queries are processed comprising a point query and/or a keyword query comprising an implicit analytics intent. In one or more embodiments, a given natural language query is processed to interpret the analytics scope of the query and to produce an executable analytic query, such as an SQL query, that can produce patterns and/or insightful results.

In at least one embodiment, when a given natural language query comprises an analytics functions, domain reasoning techniques are employed, using a predefined grammar for a plurality of different predefined categories of analytics functions, to assign or parse the analytics function into a given analytics function category. In addition, predefined arguments and a predefined sequence of actions associated with the given analytics function category are used to instantiate the analytics function. The instantiated analytics function is then interpreted in the context of a domain ontology to generate a target executable query to implement the instantiated analytics function. Finally, the predefined sequence of actions is executed for the given analytics function class on a result of the target executable query to obtain an answer to the natural language query.

In one embodiment, when a given natural language query comprises a point query and/or a keyword query, domain reasoning techniques are employed, using a predefined grammar for different predefined analytics query classes to assign or parse the natural language query into at least one predefined analytics query class. In addition, domain reasoning for the predefined analytics query class is employed to identify implicit parameters to instantiate the predefined analytics query class using the predefined arguments. The instantiated predefined analytics query class is interpreted in the context of a domain ontology to generate a target executable query to implement the instantiated predefined analytics query class. The target executable query is executed to obtain an answer to the natural language query.

Figure 1:
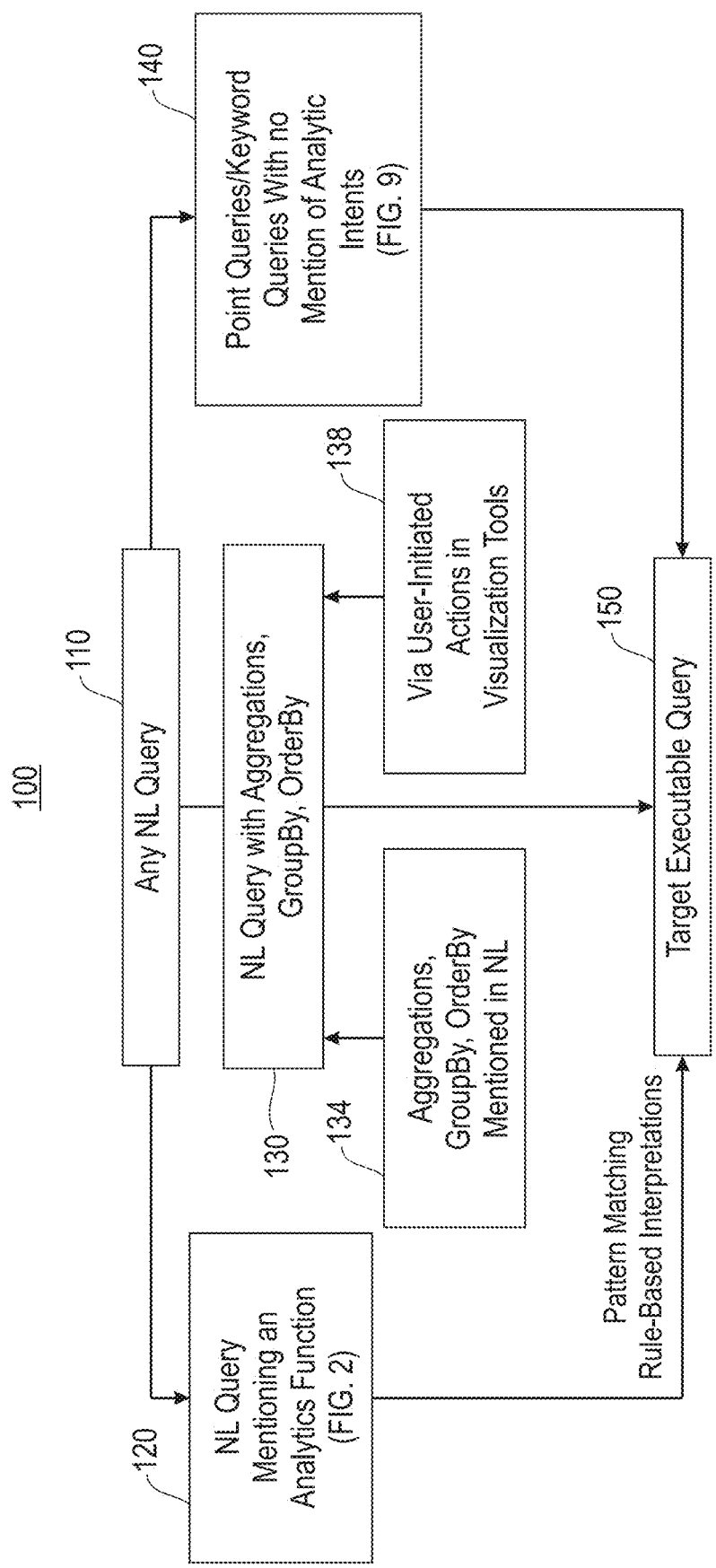
FIG. 1 is a flow diagram illustrating techniques according to an embodiment of the invention.

FIG. 1 is a flow diagram illustrating techniques 100 according to an embodiment of the invention. As shown in FIG. 1, step 110 receives a natural language query. The received natural language query is then classified into a particular processing category during steps 120, 130 or 140. The natural language query is translated into a target executable query 150, such as a SQL query, using pattern matching rule-based interpretations, as discussed hereinafter.

Step 120 classifies a natural language query that mentions an analytics function, as discussed further below in conjunction with FIG. 2. For example, a natural language query comprising an analytics function may be expressed as "Find the % growth of retail industry revenues in the last 3 years." As discussed hereinafter, the processing of such natural language queries, according to some embodiments, interprets the analytics function from the natural language query using grammar-based reasoning over domain semantics.

Step 130 classifies a natural language query that comprises Aggregations, GroupBy, and/or OrderBy terminology. For example, a natural language query comprising Aggregations, GroupBy, and/or OrderBy terminology may be expressed as "Find the top 5 Retailers in terms of revenue in the US." As shown in FIG. 1, the natural language query processed in step 130 comprises Aggregations, GroupBy, and/or OrderBy terminology mentioned in a natural language 134; or via user-initiated actions with a visualization tool 138.

In this manner, the disclosed natural language query processing techniques process a substantially exhaustive set of categories covering different classes of analytic functions to account for a large percentage of the online analytical processing (OLAP) queries generated, for example, by business users and provide a robust interpretation of each category of analytic functions in Natural Language Interface for Databases (NLIDB) systems.

Step 140 classifies a natural language query with no mention of an analytic intent, as discussed further below in conjunction with FIG. 9. For example, a natural language query with no mention of an analytic intent may be expressed as "Find retail industry revenue in the US." As discussed further below, the processing of such natural language queries, according to some embodiments, applies domain reasoning for possible analytical insights and maps the natural language query to one or more analytical query classes (such as rank views, pattern views and distribution views), as discussed further below in conjunction with FIG. 10, and reasons over the linguistic patterns in the natural language query and underlying domain semantics to determine which analytics query class can be instantiated.

The techniques depicted in FIG. 1 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 1 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

Figure 2:
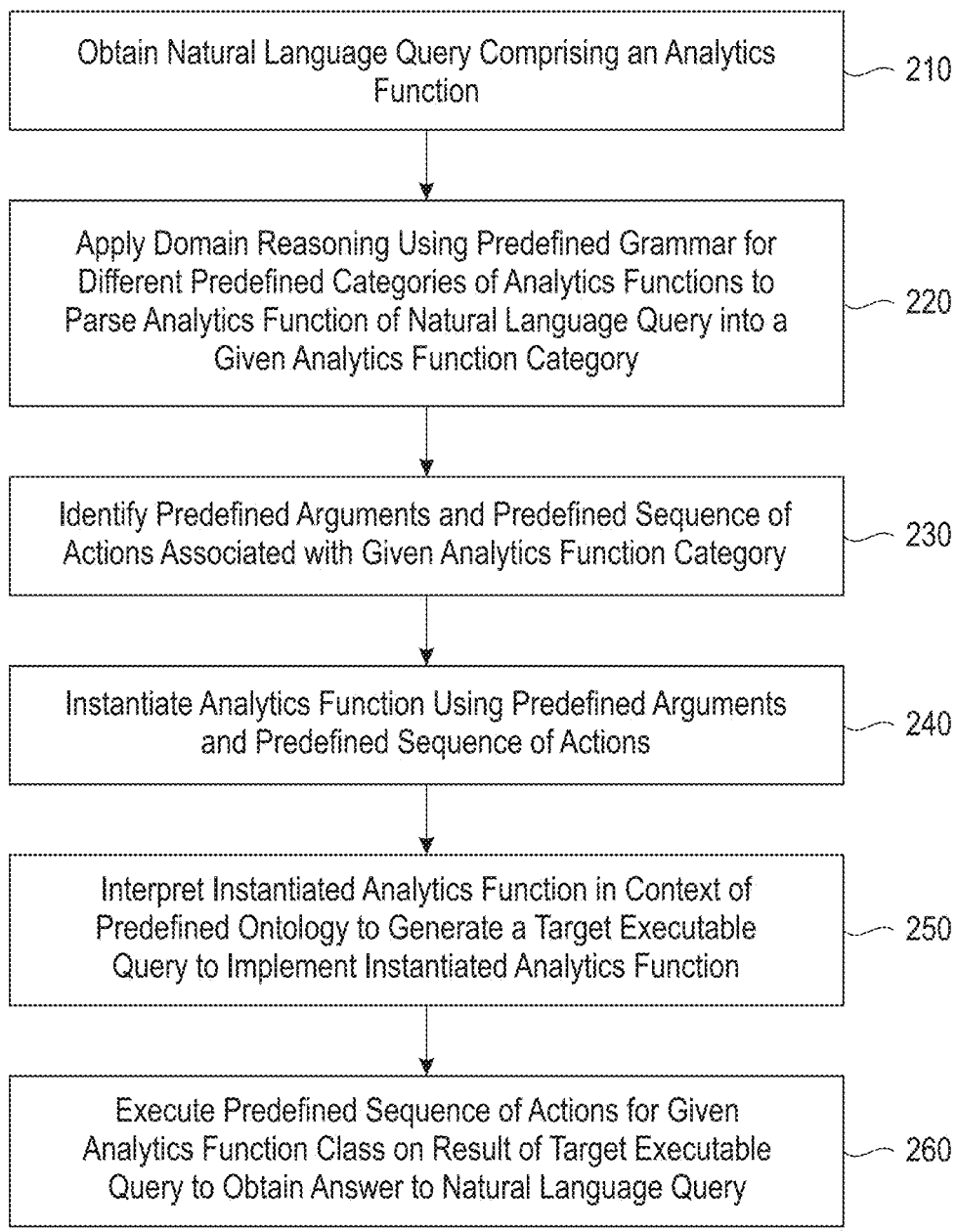
FIG. 2 is a flow diagram illustrating techniques for processing a natural language query comprising an analytics function according to one embodiment of the invention.

FIG. 2 is a flow diagram illustrating techniques 200 for processing a natural language query comprising an analytics function according to one embodiment of the invention. Step 210 includes obtaining a natural language query comprising at least one analytics function (e.g., the natural language queries of step 120 of FIG. 1). Step 220 includes applying domain reasoning using a predefined grammar for a plurality of different predefined categories of analytics functions to parse the at least one analytics function of the natural language query into a given analytics function category. Step 230 includes identifying one or more predefined arguments and a predefined sequence of actions associated with the given analytics function category. Step 240 includes instantiating the at least one analytics function using the one or more predefined arguments and the predefined sequence of actions. Step 250 includes interpreting the instantiated at least one analytics function in the context of a domain ontology to generate a target executable query to implement the instantiated at least one analytics function. Step 260 includes executing the predefined sequence of actions for the given analytics function class on a result of the target executable query to obtain an answer to the natural language query.

FIG. 3 illustrates an exemplary set of analytics function classes 300 according to some embodiments of the invention. As shown in FIG. 3, the exemplary set of analytics function classes 300 comprises a percentage operations class 310-1; a growth/decline/difference relative to reference time frame class 310-2; a difference between two measurable values class 310-3; a difference between two entities class 310-4; a statistical functions class 310-5; and a combination class 310-6.

Generally, the percentage operations class 310-1 comprises, for example, a percentage (%) share (computing a fraction of contribution in percentage); a % increase (computing a percentage increase relative to a reference value (can be from a query)); a % decrease (computing a percentage decrease relative to a reference value (can be from a query)); and a % change (computing percentage difference relative to a reference value (can be from a query)).

The exemplary growth/decline/difference relative to reference time frame class 310-2 comprises, for example, one or more of a yearly/monthly/weekly/daily growth (computing growth relative to a reference time frame); a yearly/monthly/weekly/daily decline (computing decline relative to a reference time frame); and a yearly/monthly/weekly/daily change (computing change relative to a reference time frame).

The exemplary difference between two measurable values class 310-3 comprises, for example, a difference between measure1 and measure2, and a difference between measure in time1 and time2.

The exemplary difference between two entities class 310-4 optionally provides both values side by side. The exemplary statistical functions class 310-5 provides, for example, one or more of a range, median and variance of numeric values.

The exemplary combination class 310-6 comprises, for example, a chained combination of one or more of the classes 310-1 through 310-4, such as a difference in percentage share and a growth comparison.

FIG. 4 illustrates an exemplary set of domain examples 400 according to an embodiment of the invention. As shown in FIG. 4, a number of examples are provided for a number of cases 410 of the classes 310 of analytics functions, as discussed above in conjunction with FIG. 3. For each analytics function case shown in FIG. 4, corresponding example queries are provided for a representative finance domain 420, a healthcare domain 430 and a retail domain 440.

For a percentage computation case 410-1, representative queries for a finance domain 420 comprise "What is a percentage share of revenues Amazon generated in 2018 in e-commerce industry?" and "What is the percentage change of net profit for Microsoft in this quarter?" In addition, representative queries for a healthcare domain 430 comprise "What percentage of insurance customers are from the European Union (EU)?" and "What is the percentage decrease in insurance payouts by Star Health in 2018?" Finally, representative queries for a retail domain 440 comprise "What percentage of Net sales is generated by Apparels in 2018?" and "What is the percentage increase in gross sales for Peter England in Karnataka in 2018?"

For a growth/decline case 410-2, a representative query for a finance domain 420 comprises "What is the growth of revenues for IBM in this quarter?" In addition, a representative query for a healthcare domain 430 comprises "What is the growth in number of insurance enrollments this year?" Finally, a representative query for a retail domain 440 comprises "How much the gross sales of Peter England has grown in last two quarters?"

For a difference case 410-3, a representative query for a finance domain 420 comprises "How much is the difference between revenues and gross profit for IBM this year?" In addition, a representative query for a healthcare domain 430 comprises "How much is the difference between enrollment pay ins and payouts for Star Healthcare this year?" Finally, a representative query for a retail domain 440 comprises "What is the difference between gross sales and net sales for Allen Solly in last two months?"

For a compare case 410-4, a representative query for a finance domain 420 comprises "Compare the revenue numbers between Microsoft and IBM in last 5 years." In addition, a representative query for a healthcare domain 430 comprises "Compare the number of enrollments and exits for Star Healthcare in 2018." Finally, a representative query for a retail domain 440 comprises "Compare the GSV generated by Van Huessen in November 2018 with 2017."

For a statistical functions case 410-5, a representative query for a finance domain 420 comprises "What is the variance of profits generated by Alphabet in last 3 years?" In addition, a representative query for a healthcare domain 430 comprises "What is the median amount of sum insured availed by enrollments in Star Health?" Finally, a representative query for a retail domain 440 comprises "What is the range of manufacturer retail prices (MRPs) offered by Van Huessen products in Bangalore?"

For a combinations case 410-6, a representative query for a finance domain 420 comprises "Which company had the maximum revenues growth in 2018?" In addition, a representative query for a healthcare domain 430 comprises "What is the growth of the average sum insured opted for enrollments to Star Health?" Finally, a representative query for a retail domain 440 comprises "Compare the Net sales growth for Allen Solly with Peter England."

Figure 5:
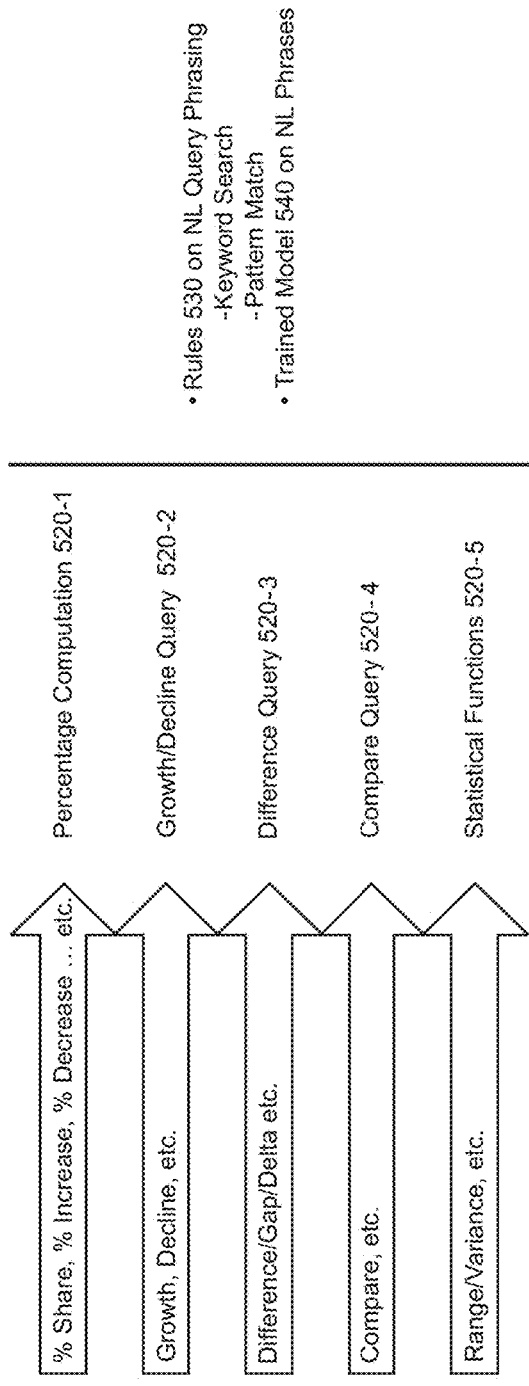
FIG. 5 illustrates exemplary functionality for detection and reasoning with respect to an exemplary analytics function according to one embodiment of the invention.

FIG. 5 illustrates exemplary functionality 500 for detection and reasoning with respect to an exemplary analytics function according to one embodiment of the invention. As shown in FIG. 5, in one or more embodiments, the functionality 500 comprises one or more rules 530 on natural language query phrasing and/or a trained model 540 on natural language phrases to map keywords/patterns 510 of a given natural language query, to one or more corresponding analytics function classes 520. In the example of FIG. 5, the exemplary analytics function classes 520 comprise a percentage computation query class 520-1; a growth/decline query class 520-2; a difference query class 520-3; a compare query class 520-4; and a statistical functions class 520-5.

The functionality 500 comprises additional functionality indicating, for each analytics function class 520, corresponding arguments 560. Generally, the additional functionality employs annotators on a natural language query; dependency parsing; and domain reasoning for an implicit base in percentage queries; implied compare filters and/or changes with respect to a reference time frame.

In particular, the additional functionality identifies arguments 560 for each analytics function class 520. As shown in FIG. 5, the additional functionality identifies the following arguments 560-1 for the percentage computation class 520-1:

ofEntity(E1)—Entity;
onNumericEntity(N)—Numeric Entity (for % share); and
Reference Time(RT)—Time Entity (for % increase/decrease/change).

The additional functionality identifies the following arguments 560-2 for the growth/decline class 520-2:

onNumericEntity(N)—Numeric Entity; and
Reference Time(RT)—Time Entity.

The additional functionality identifies the following arguments 560-3, 560-4 for the difference/compare classes 520-3, 520-4:

onNumericEntity1(N1)—Numeric Entity;
onNumericEntity2(N2)—Numeric Entity;
fromTime(t1)—Time Entity; and
toTime(t2)—Time Entity.

The additional functionality identifies the following argument 560-5 for the statistical functions class 520-5:

OnNumericEntity(N)—Numeric Entity.

Figure 6:
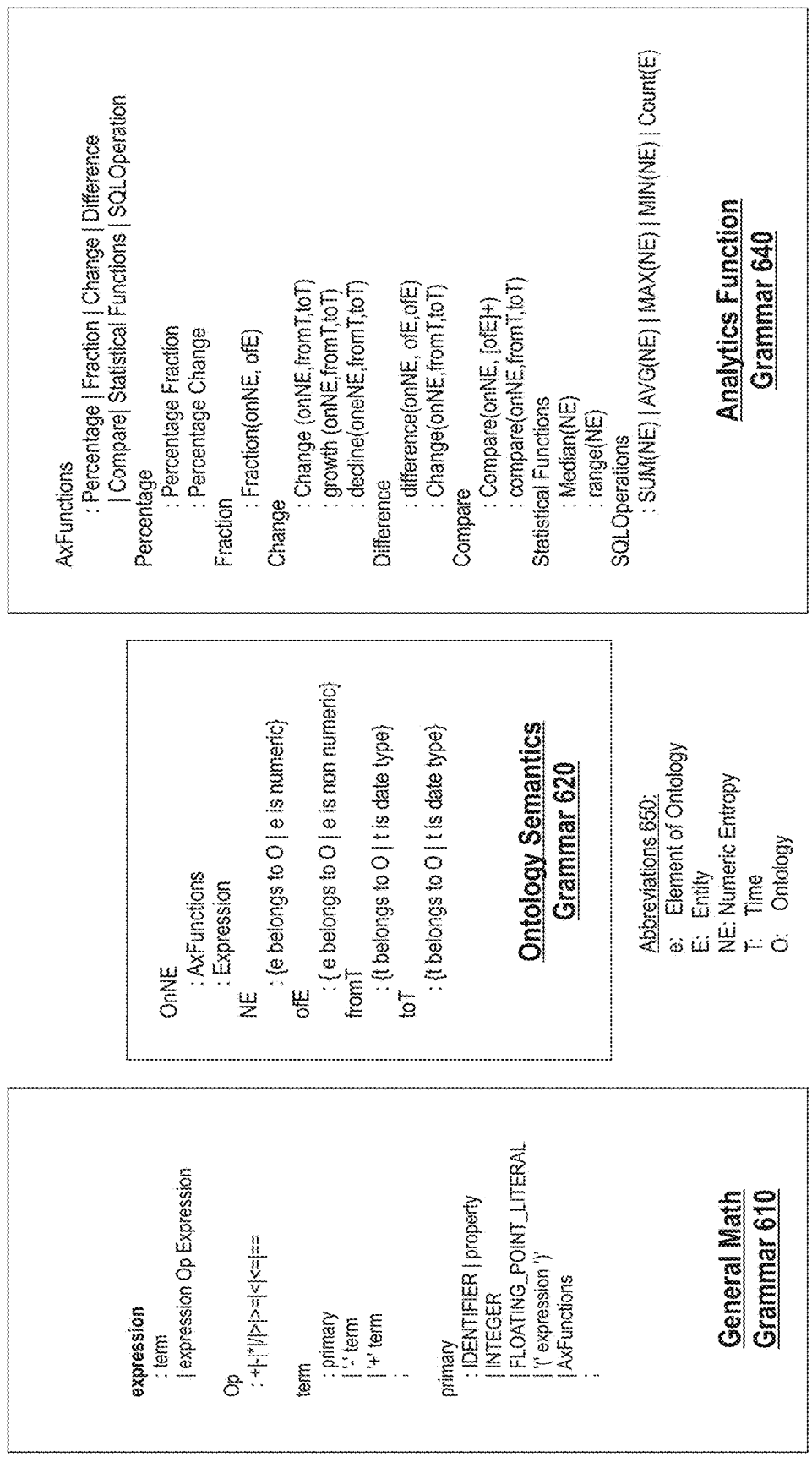
FIG. 6 illustrates an exemplary grammar for analytic expression according to at least one embodiment of the invention.

FIG. 6 illustrates an exemplary grammar 600 for analytic expression according to at least one embodiment of the invention. As shown in FIG. 6, the exemplary grammar 600 for analytic expression comprises a general math grammar 610; an ontology semantics grammar 620; an analytics function grammar 640; and a set of abbreviations 650. Generally, the exemplary general math grammar 610 shown in FIG. 6 defines how a math expression should be interpreted. Generally, the exemplary ontology semantics grammar 620 shown in FIG. 6 defines the semantics of the ontology for a given domain. Generally, the exemplary analytics function grammar 640 shown in FIG. 6 defines how an analytics function should be interpreted for various classes of analytics functions.

While FIG. 6 illustrates one exemplary grammar 600 for analytic expression, other alternative grammars could be employed, as would be apparent to a person of ordinary skill in the art.

FIGS. 7A and 7B, collectively, illustrate an exemplary handling 700 of analytics functions according to some embodiments of the invention. As shown in FIG. 7A, for each analytics functions (AxF) category 710, the corresponding arguments 720 and sequence of actions 730 are provided. For an exemplary percentage share analytics functions category 710, the corresponding arguments 720 are:

ofEntity(E)—Entity; and
onNumericEntity(NE), and the corresponding sequence of actions 730 are:

v1: Compute the value of NE for E,
(without considering any percentage action);
v2: Compute the value of NE without any filter for E; and
Return v1*100/v2.

For an exemplary percentage increase/decrease/change analytics functions category 710, the corresponding arguments 720 are:

onEntity(NE); and
Reference Time(RT), where RT is reasoned over the ontology and the query filters (e.g., on a weekly, monthly, or yearly basis), and the corresponding sequence of actions 730 are:

v1: compute the query for each possible refTime,
(within query filters and previous);
v2: for each reftime do,
((v1 at refTime−v1 at refTime−1)/v1 at reftime−1)*100.

For an exemplary growth/decline/change analytics functions category 710, the corresponding arguments 720 are:

onEntity(NE); and
Reference Time(RT), where RT is reasoned over the ontology and the query filters (e.g., on a weekly, monthly, or yearly basis), and the corresponding sequence of actions 730 are:

vT: compute query for each possible refTime,
(within query filters and previous);
for each reftime do,
$((v_T - v_{T-1} \text{ at refTime}-1)/v_{T-1})$.

As shown in FIG. 7B, for an exemplary difference analytics functions category 710, the corresponding arguments 720 are:

onNumericEntity(NE);
ofEntity1(E1);
ofEntity2(E2);
fromTime(t1); and
toTime(t2).

where RT is reasoned over the ontology and the query filters (e.g., on a weekly, monthly, or yearly basis), and the corresponding sequence of actions 730 are:

If(E1 is present && E2 is present):
V1: Compute NE for E1;
V2: Compute BE for E2; and
Return V1-V2;
If(T1 is present && T2 is present):
V1: Compute NE for T1;
V2: Compute NE for T2; and
Return V1-V2.

For an exemplary compare analytics functions category 710, the corresponding arguments 720 are:

Between Entities (E1, E2, . . . Em);
Between Timeframes(fromT, toT); and
onNumericEntity(NE), and the corresponding sequence of actions 730 are:

If(multiple Es):
Compute N for the query for each E; and
Return one row for Each E;
If(multiple Ts):
Compute N for the query for each r; and
Return one row for Each T.

For an exemplary statistical functions analytics functions category 710, the corresponding arguments 720 are:

onNumericEntity(NE); and
Function: f, and the corresponding sequence of actions 730 are:

Compute NE for the query;
Consider value of NE for each row as a data point; and
Compute f over the data points.

FIG. 8 illustrates an exemplary set of additional domain examples 800 according to one embodiment of the invention. As shown in FIG. 8, for an exemplary analytics function category 810, a first representative query is "What is the percentage share of revenues generated by Apparel?" and the corresponding arguments 820 are:
  onNE=revenues; and
  ofE=Apparel,
and the corresponding sequence of actions 830 are:
  v1: Compute the value of N for E1,
  (without considering any percentage action);
  v2: Compute the value of N without any filter for E1; and
  Return v1*100/v2,
where V1 is the revenues generated by apparel and V2 is the revenues generated in total.

A second representative query is "Compare the GSV generated by stores in Karnataka between January to February this year with last year," and the corresponding arguments 820 are:
  T1=January to February 2018;
  T2=January to February 2017; and
  ofNumericEntity=GSV,
and the corresponding sequence of actions 830 are:
  If(multiple Ts):
  Compute N for the query for each T; and
  Return one row for Each T,
where V1 is compute GSV (Gross Sales Value) for each store in time frame T1, and V2 is compute GSV for each store in time frame T2. The values of V1 and V2 are returned for each store.

A third representative query is "What is the growth in net sales for Peter England between October to December 2017?" and the corresponding arguments 820 are:
  onE=net sales,
where the reference time frame is monthly, and the corresponding sequence of actions 830 are:
  $v_T$: compute the query for each possible refTime,
  (within query filters and previous); and
  for each reftime do,
  $((v_T - v_{T-1} \text{ at refTime}-1)/v_{T-1}))$,
where $V_1, V_2, V_3, V_4$ correspond to computing NSV (net sales value) for September, October, November, and December, respectively, and the following values are returned:
  (V1−V2)/V1, (V2−V3)/V2, (V3−V4)/V4.

Figure 9:
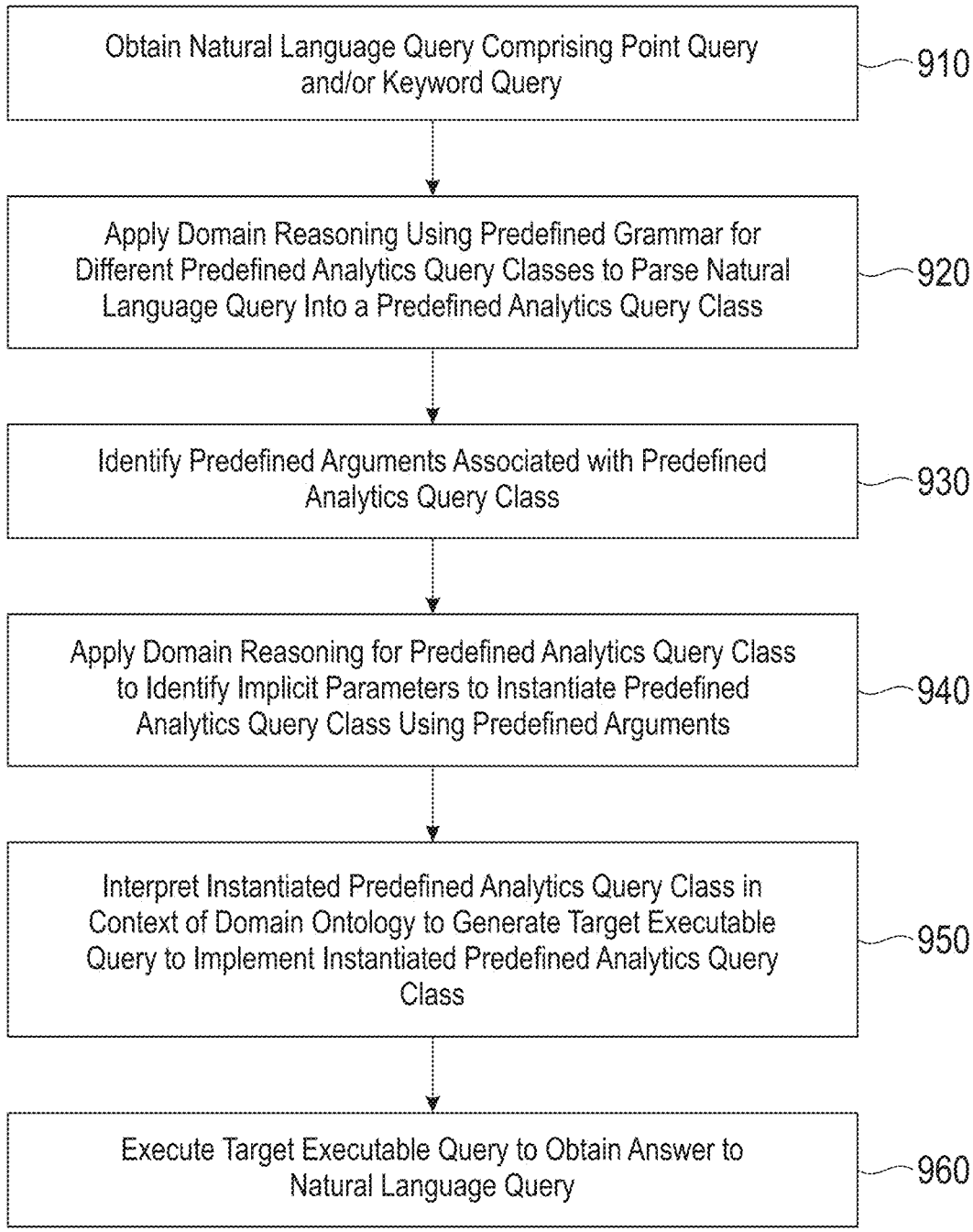
FIG. 9 is a flow diagram illustrating techniques for processing a natural language query comprising point queries and/or keyword queries according to an embodiment of the invention.

FIG. 9 is a flow diagram illustrating techniques 900 for processing a natural language query comprising point queries and/or keyword queries according to an embodiment of the invention. Step 910 includes obtaining a natural language query comprising point query and/or keyword query (e.g., the natural language queries of step 140 of FIG. 1).

Step 920 includes applying domain reasoning using a predefined grammar for different predefined analytics query classes to parse the natural language query into a predefined analytics query class. Step 930 includes identifying predefined arguments associated with the predefined analytics query class.

Step 940 includes applying domain reasoning for the predefined analytics query class to identify implicit parameters to instantiate the predefined analytics query class using the predefined arguments.

Step 950 includes interpreting the instantiated predefined analytics query class in the context of a domain ontology to generate a target executable query to implement the instantiated predefined analytics query class.

Step 960 includes executing the target executable query to obtain an answer to the natural language query.

The techniques depicted in FIG. 9 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 9 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

FIG. 10 illustrates an exemplary set of analytics query classes 1000 according to some embodiments of the invention. As shown in FIG. 10, the exemplary set of analytics query classes 1000 comprises a rank query class 1010-1, a pattern query class 1010-2, and a distribution query class 1010-3. The various analytics query classes 1000 are discussed further below in conjunction with FIG. 13. An exemplary rank query class 1010-1 query may be expressed, for example, as "Find the Top 100 Retailers in the US in terms of revenues." An exemplary pattern query class 1010-2 query may be expressed, for example, as "Find the average revenue change over the last 5 years in retail." An exemplary distribution query class 1010-3 query may be expressed, for example, as "How many retailers generate revenue in the range {A,B}."

FIG. 11 illustrates an exemplary sets of domain examples 1100 according to some embodiments of the invention. Consider a first exemplary natural language query 1110 expressed as "What are the employment numbers in the software industry in the US?" The analytics intent 1115 of the first exemplary natural language query 1110, for a rank view 1110-1, can be expressed, for example, as "Find the Top K recruiters in the Software Industry," and the corresponding queries may be expressed, for example, as "Rank companies by their number of employees," and/or "Find the Top K companies with highest employee counts."

The analytics intent 1115 of the first exemplary natural language query 1110, for a pattern view 1110-2, can be expressed, for example, as "Find how the total employee numbers in the software industry has increased/decreased in the last ten years," and the corresponding queries may be expressed, for example, as "Find the total number of employees working in software industries for each year," and/or "Plot the total number of employees against each year."

The analytics intent 1115 of the first exemplary natural language query 1110, for a distribution view 1110-3, can be expressed, for example, as "Find the number of companies of different size (in employee counts)." and the corresponding queries may be expressed, for example, as "Estimate the Size of a company in terms of employee count in intervals of 0-1000, 1000-5000, 5000 and more," and/or "Count the number of companies in each interval."

Consider a second exemplary natural language query 1120 expressed as "How much time do doctors spend with patients?" The analytics intent 1125 of the second exemplary natural language query 1120, for a rank view 1110-1, can be expressed, for example, as "Find the top K doctors who spend the most time per patient in each year," and the corresponding queries may be expressed, for example, as "For each doctor find average time spent per patient for each year," and/or "Rank doctors by the average time spent per patient for each year."

The analytics intent 1125 of the second exemplary natural language query 1120, for a pattern view 1110-2, can be expressed, for example, as "Flow has the average time spent per patient has changed in the last 10 years," and the corresponding queries may be expressed, for example, as "Find the average time spent by doctors per patient for each year," and/or "Plot the average time spent per patient per year for the last 10 years."

The analytics intent 1125 of the second exemplary natural language query 1120, for a distribution view 1110-3, can be expressed, for example, as "Find the number of doctors in different intervals of time spent," and the corresponding queries may be expressed, for example, as "For each doctor, find the average time spent with patients," and/or "Count the number of doctors by their average spent time in intervals of 0-10 minutes, 10-30 minutes, 30 minutes-1 hour, 1 hour and more."

FIG. 12 illustrates additional domain examples 1200 according to one or more embodiments of the invention. Generally, FIG. 12 provides examples in the retail industry 1220 and the healthcare industry 1230 for a number of different analytics intents 1210.

For an exemplary "Find top entities ranked by some measurable numeric quantity" analytics intent 1210-1, a representative query is expressed for the retail industry 1220 as "How are revenue numbers for the retail industry in the US?" with a resulting view 1220-1 shown in FIG. 12. Similarly, a representative query is expressed for the healthcare industry 1230 as "How much time do doctors spend with patients?" with a resulting view 1230-1.

For an exemplary "Find how measurable numeric quantity has increased/decreased over time period" analytics intent 1210-2, a representative query is expressed for the retail industry 1220 as "How are revenue numbers for the retail industry in the US?" with a resulting view 1220-2 shown in FIG. 12. Similarly, a representative query is expressed for the healthcare industry 1230 as "How much time do doctors spend with patients?" with a resulting view 1230-2.

For an exemplary "Find distribution of entities across different segments of values of some numeric quantity" analytics intent 1210-3, a representative query is expressed for the retail industry 1220 as "How are revenue numbers for the retail industry in the US?" with a resulting view 1220-3 shown in FIG. 12. Similarly, a representative query is expressed for the healthcare industry 1230 as "How much time do doctors spend with patients?" with a resulting view 1230-3.

FIG. 13 illustrates an exemplary technical design 1300 comprising exemplary target views for various analytics queries according to an embodiment of the invention. Generally, as shown in FIG. 12, a pattern view query 1310 comprises a query asking to find a pattern among "similar numbers" computed across a set of variable parameters. For an analytics query class comprising pattern view queries 1310, the predefined arguments can be expressed, as follows:

Compute–[Aggregation|PointValue] P;
Filter(Optional)→(P→filters); and
Variable Parameters (P→params).

Similarly, a rank view query 1320 comprises a query asking to rank a set of entities based on some score to be computed. For an analytics query class comprising rank view queries 1320, the predefined arguments can be expressed, as follows:

Rank—Entities E;
Filter(optional): E→Filters;
Score: [Aggregation|PointValue](E→prop);
Score Comparison Function(Optional): Scaling_function (Score); and
Repeat: For each value of Properties P1, . . . Pm.

Likewise, a distribution view query 1330 comprises a query asking about a distribution of certain entities across computed intervals. For an analytics query class comprising distribution view queries 1330, the predefined arguments can be expressed, as follows:

Interval—Property P;
Filter(Optional): P→filters;
Count: P→Es; and
Repeat: For each value of Properties P1, . . . Pm.

Figure 14:
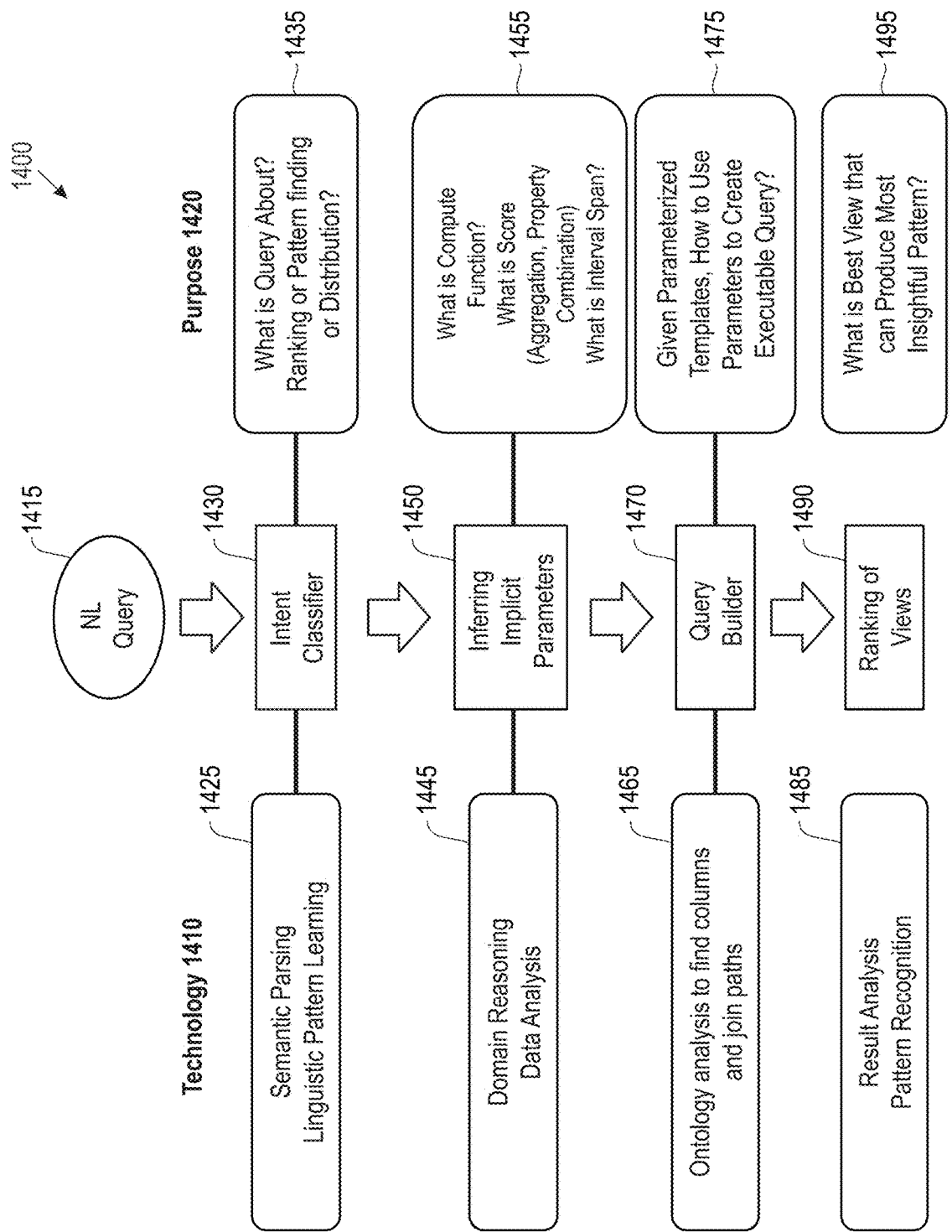
FIG. 14 is a flow diagram illustrating techniques for processing a natural language query according to at least one embodiment of the invention.

FIG. 14 is a flow diagram illustrating techniques 1400 for processing a natural language query according to at least one embodiment of the invention. As shown in FIG. 14, a natural language query 1415 is initially received. For each processing step shown in FIG. 14 the corresponding technology 1410 and purpose 1420 are also shown.

Step 1430 includes applying an intent classifier to the natural language query 1415 using semantic parsing and linguistic pattern learning 1425 to learn what the query is about 1435 (e.g., a ranking or pattern finding or a distribution).

Step 1450 includes inferring implicit parameters for the natural language query 1415 using domain reasoning and data analysis 1445 to learn what is the compute function of the query; what is the score of the natural language query 1415 (e.g., aggregation, property combination), and/or what is the interval span of the natural language query 1455.

Step 1470 includes building the executable query for the natural language query 1415 using an ontology analysis to find the columns and join the paths 1465 to, given the parameterized templates, determine how to use the parameters to create the executable query 1475.

Step 1490 includes ranking the views for the natural language query 1415 using a result analysis and pattern recognition 1485 to determine the best view that can produce a substantially most insightful pattern 1495.

Figure 15:
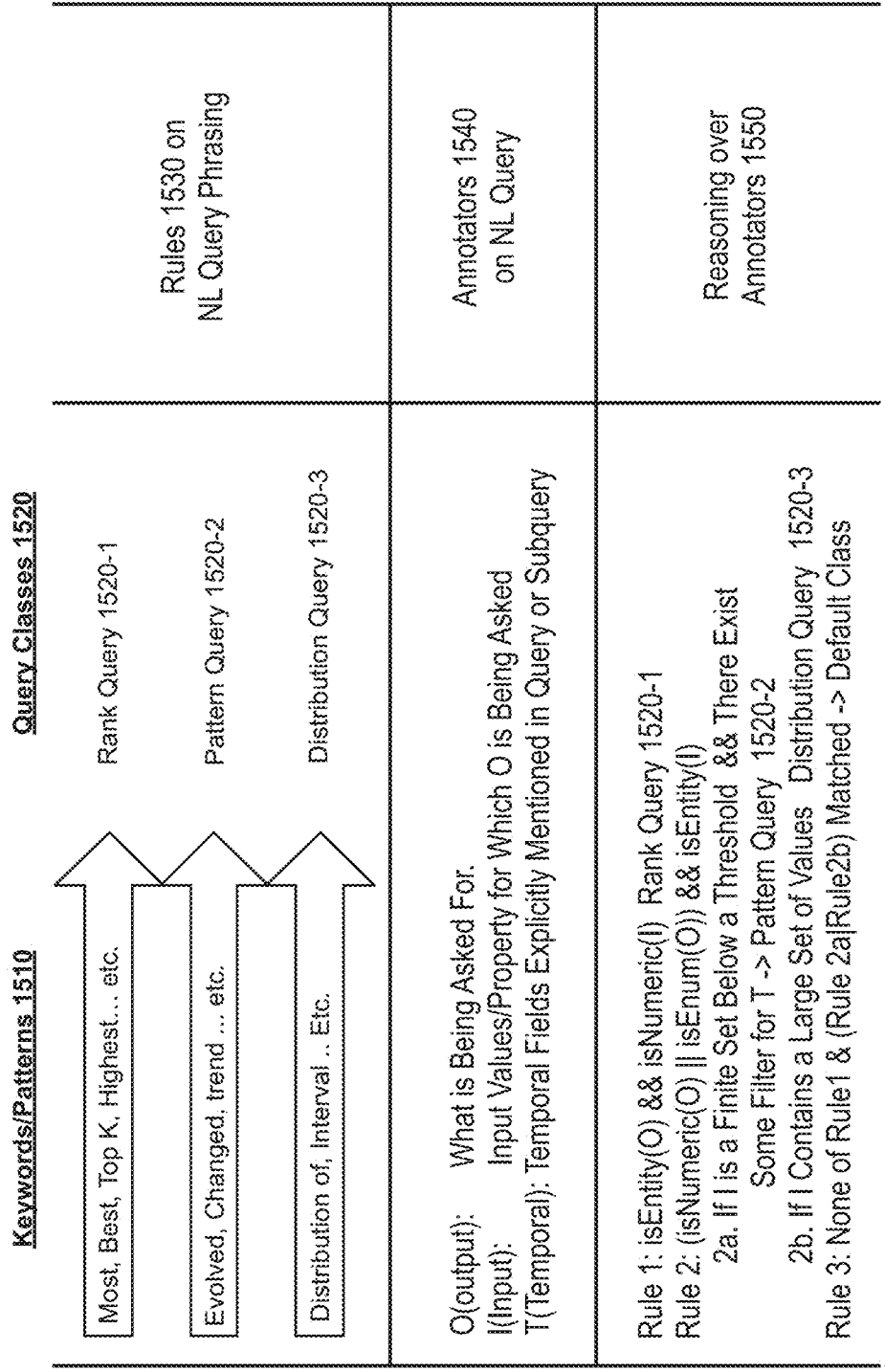
FIG. 15 illustrates exemplary functionality for detection and reasoning with respect to exemplary query classes according to one embodiment of the invention.

FIG. 15 illustrates exemplary functionality 1500 for detection and reasoning with respect to exemplary query classes according to one embodiment of the invention. As shown in FIG. 15, in one or more embodiments, the functionality 1500 comprises one or more rules 1530 on natural language query phrasing to map keywords/patterns 1510 of a given natural language query, to one or more corresponding query classes 1520. In the example of FIG. 15, the exemplary query classes 1520 comprise a rank query class 1520-1, a pattern query class 1520-2, and a distribution query class 1520-3.

The functionality 1500 comprises exemplary annotators 1540 on a natural language query that define the representative terminology for the natural language query, as follows:

O(output): What is Being Asked For;

I(Input): Input Values/Property for Which O is Being Asked; and

T(Temporal): Temporal Fields Explicitly Mentioned in Query or Subquery.

The functionality 1500 further comprises a section 1550 to specify reasoning over the indicated annotators 1540. In particular, the section 1550 specifies a number of exemplary rules that are used to classify a given natural language query into one or more corresponding query classes 1520, as follows:

Rule 1: isEntity(O) && isNumeric(I)→Rank Query 1520-1;

Rule 2: (isNumeric(O)||isEnum(O))&& isEntity(I),

2a. If I is a Finite Set Below a Threshold && There Exists Some Filter for T→Pattern Query 1520-2;

2b. If I Contains a Large Set of Values→Distribution Query 1520-3;

Rule 3: None of Rule1 & (Rule 2a|Rule2b) Matched→Default Class.

In some embodiments, the exemplary rules in section 1550 are used to classify a given natural language query into one or more corresponding query classes 1520, when the rules 1530 comprising the keywords/patterns 1510 are not satisfied.

Figure 16:
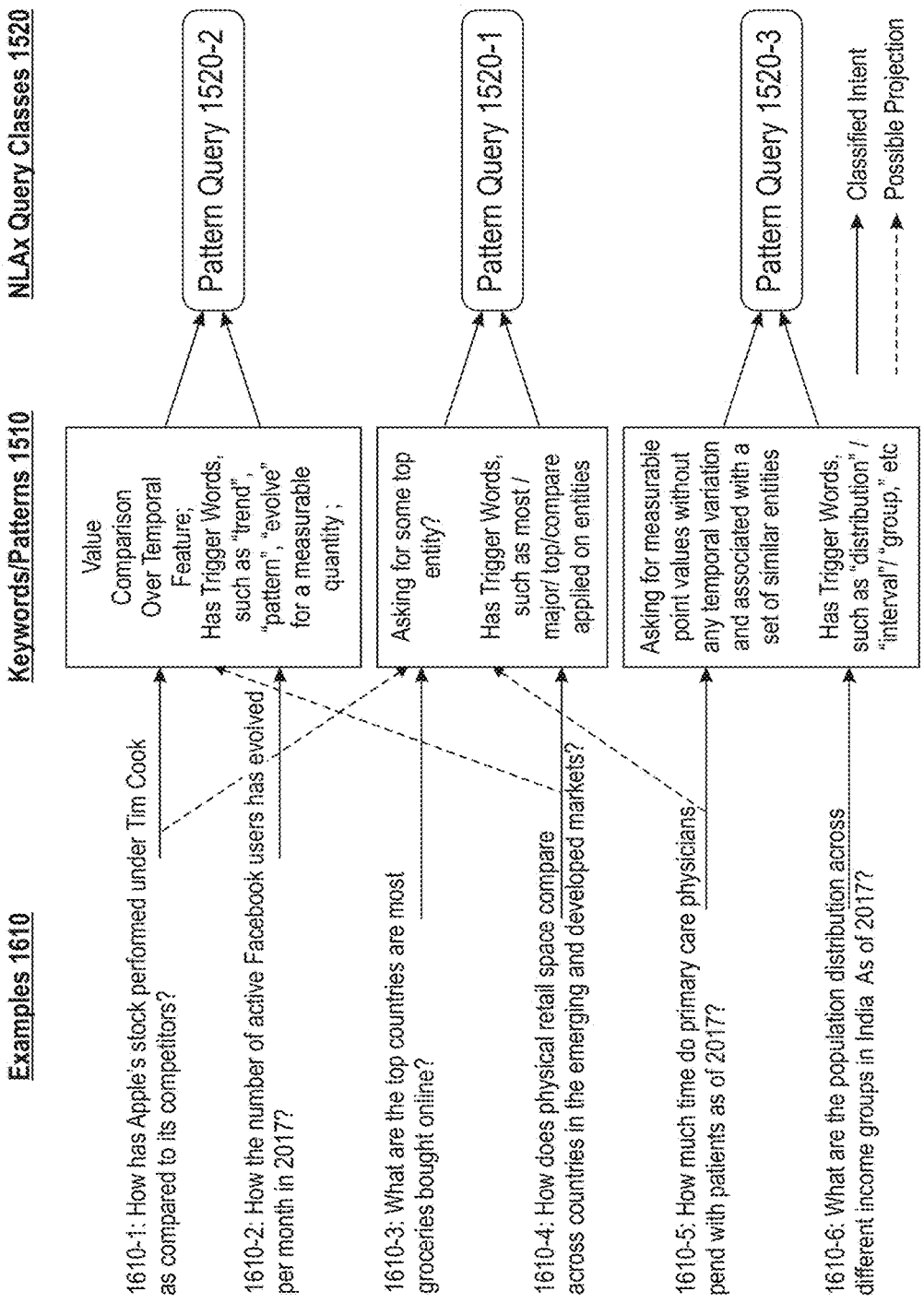
FIG. 16 illustrates intent classification of natural language query into one or more corresponding analytics query classes according to some embodiments of the invention.

FIG. 16 illustrates intent classification 1600 of natural language queries into one or more corresponding analytics query classes according to some embodiments of the invention. In the notation of FIG. 16, a classified intent is represented using a solid line and a possible projection is represented using a dashed line.

For each example natural language query 1610 shown in FIG. 16, the keywords/patterns 1510 of FIG. 15 are used to map a given natural language query to one or more corresponding query classes 1520.

For the example query 1610-1 of "How has Apple's stock performed under Tim Cook, as compared to its competitors?" the keywords/patterns 1510 analysis suggests that the query 1610-1 includes a "value comparison over temporal feature." Thus, the example query 1610-1 is classified as a pattern query 1520-2.

For the example query 1610-2 of "How the number of active Facebook users has evolved per month in 2017?" the keywords/patterns 1510 analysis suggests that the query 1610-2 "Has Trigger Words, such as "trend", "pattern", "evolve" for a measurable quantity." Thus, the example query 1610-2 is classified as a pattern query 1520-2.

For the example query 1610-3 of "in what countries are the most groceries bought online?" the keywords/patterns 1510 analysis suggests that the query 1610-3 is asking for some top entity. Thus, the example query 1610-3 is classified as a rank query 1520-1.

For the example query 1610-4 of "How does physical retail space compare across countries in the emerging and developed markets?" the keywords/patterns 1510 analysis suggests that the query 1610-4 includes trigger words (such as most/major/top/compare) applied to entities. Thus, the example query 1610-4 is classified as a rank query 1520-1.

For the example query 1610-5 of "How much time do primary care physicians spend with patients as of 2017?" the keywords/patterns 1510 analysis suggests that the query 1610-5 is "Asking for measurable point values without any temporal variation and associated with a set of similar entities." Thus, the example query 1610-5 is classified as a distribution query 1520-3.

For the example query 1610-6 of "What are the population distributions across different income groups in India, as of 2017?" the keywords/patterns 1510 analysis suggests that the query 1610-6 includes trigger words (such as distribution/interval/group, etc.). Thus, the example query 1610-6 is classified as a distribution query 1520-3.

In one or more embodiments, the following representative terminology is employed:

OE→Output Entity: entity for which the question is being asked for;

INP→Input Parameter;

DF→Domain Functionality: defined for a set of concepts S;

DF captures neighborhood concepts of S in the Ontology Graph;

Indexed Values:

Data Instance Values: IBM (Company.name), US (Country.name), etc.;

Time Range Matches:

If input query mentions any time range, e.g., "Since 2011," "in last 10 years," "between 2011 and 2018," etc.;

Comparator Matches:

If input query mentions any comparison, such as: more than 1000, less than 1 million, etc.

Figure 17:
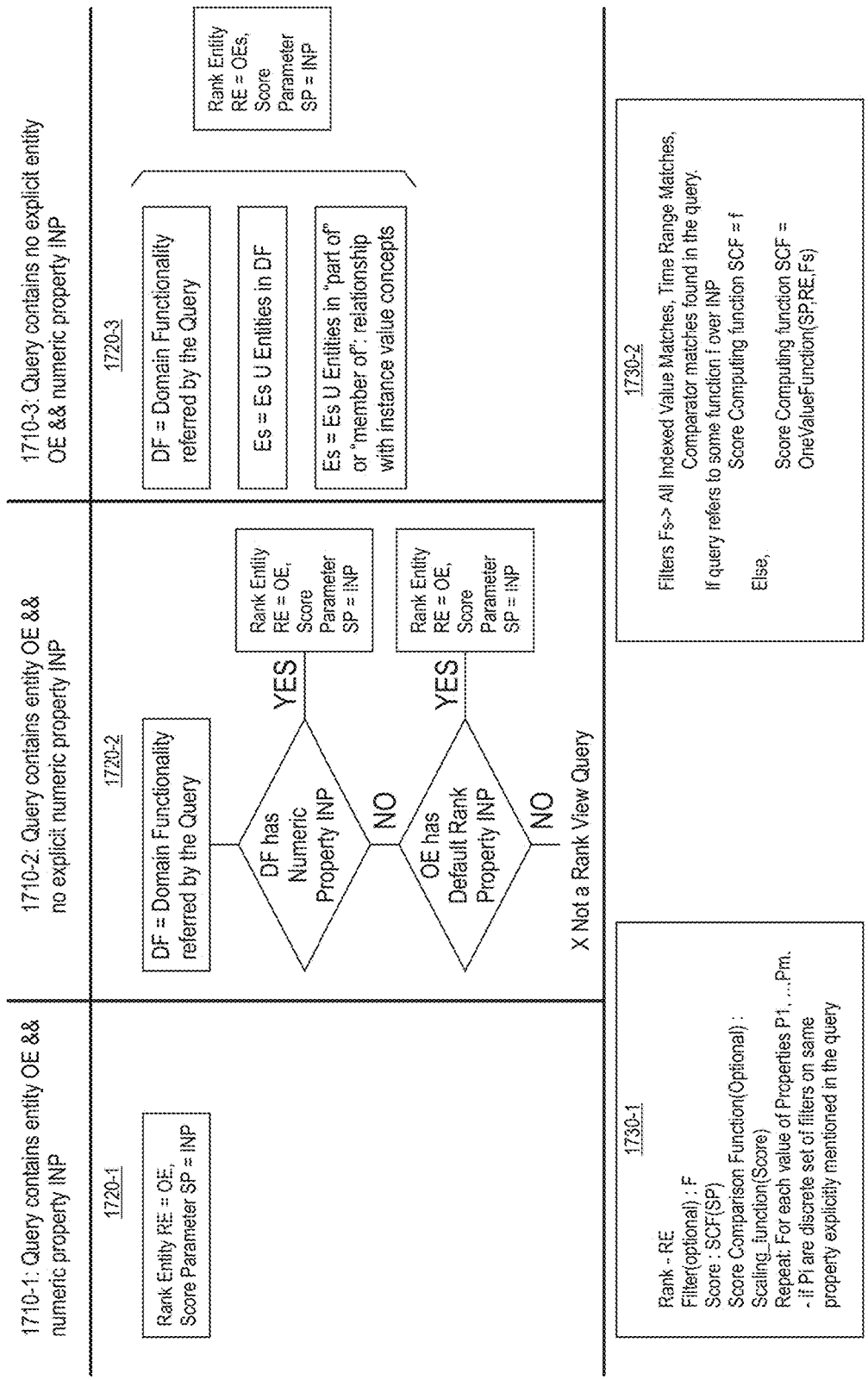
FIGS. 17 through 19, collectively, illustrate exemplary functionality for reasoning with respect to the exemplary analytics query classes according to one or more embodiments of the invention.

FIG. 17 illustrates exemplary functionality 1700 for reasoning with respect to the exemplary rank view query class according to one embodiment of the invention. Generally, in one or more embodiments, the exemplary functionality 1700 identifies one set of arguments for a given natural language query that is classified into the rank view query class.

As shown in FIG. 17, a received natural language query is classified during step 1710 for processing treatment by one of sections 1720-1 through 1720-3, based on whether or not the received natural language query comprises an entity OE (Output Entity) and/or a numeric property INP. In particular, the received natural language query is classified at step 1710-1 when the received natural language query contains an entity OE and a numeric property INP. In addition, the arguments are assigned to the natural language query in section 1720-1, as follows:

Rank Entity RE=OE,

Score Parameter SP=INP.

The received natural language query is classified at step 1710-2 when the received natural language query contains an entity OE but does not contain an explicit numeric property INP. The arguments are assigned to the natural language query in section 1720-2, as follows, where DF indicates the domain functionality referred to by the query:

When the domain functionality has Numeric Property INP:

Rank Entity RE=OE,

Score Parameter SP=INP;

When the Output Entity has Default Rank Property INP:

Rank Entity RE=OE,

Score Parameter SP INP;

Otherwise, the received natural language query is not a rank view query.

The received natural language query is classified at step 1710-3 when the received natural language query does not contain an explicit entity OE but contains a numeric property INP. The arguments are assigned to the natural language query in section 1720-3, as follows, where DF indicates the domain functionality referred to by the query, which can be represented as the concepts in the ontology that are either directly referred to in the query or the closely related concepts of the concepts that are directly referred to in the query, Es indicates a union of Entity concepts in DF and Entity concepts which have a "part of" or "member of" relationship with the Concepts in DF, whose instance has been referenced in the query:

Rank Entity RE=OEs,
Score Parameter SP=INP.

As shown in FIG. 17, the domain reasoning 1700 further comprises functionality 1730-1 that specifies how to use the Score Parameter populated in section 1720. The exemplary functionality 1730-1 specifies the score computing function as follows:

Filters Fs→All Indexed Value Matches, Time Range Matches.
Comparator matches found in the query.
If query refers to some function f over INP
Score Computing function SCF=f
Else,
Score Computing function SCF=OneValueFunction(SP, RE,Fs).

In addition, section 1730-2 specifies the following functionality for rank view queries:

Rank—RE;
Filter(optional): F;
Score: SCF(SP);
Score Comparison Function(Optional):
Scaling_function(Score);
Repeat: For each value of Properties P1, . . . Pm,
if Pi are discrete set of filters on same property explicitly mentioned in the query.

Figure 18:
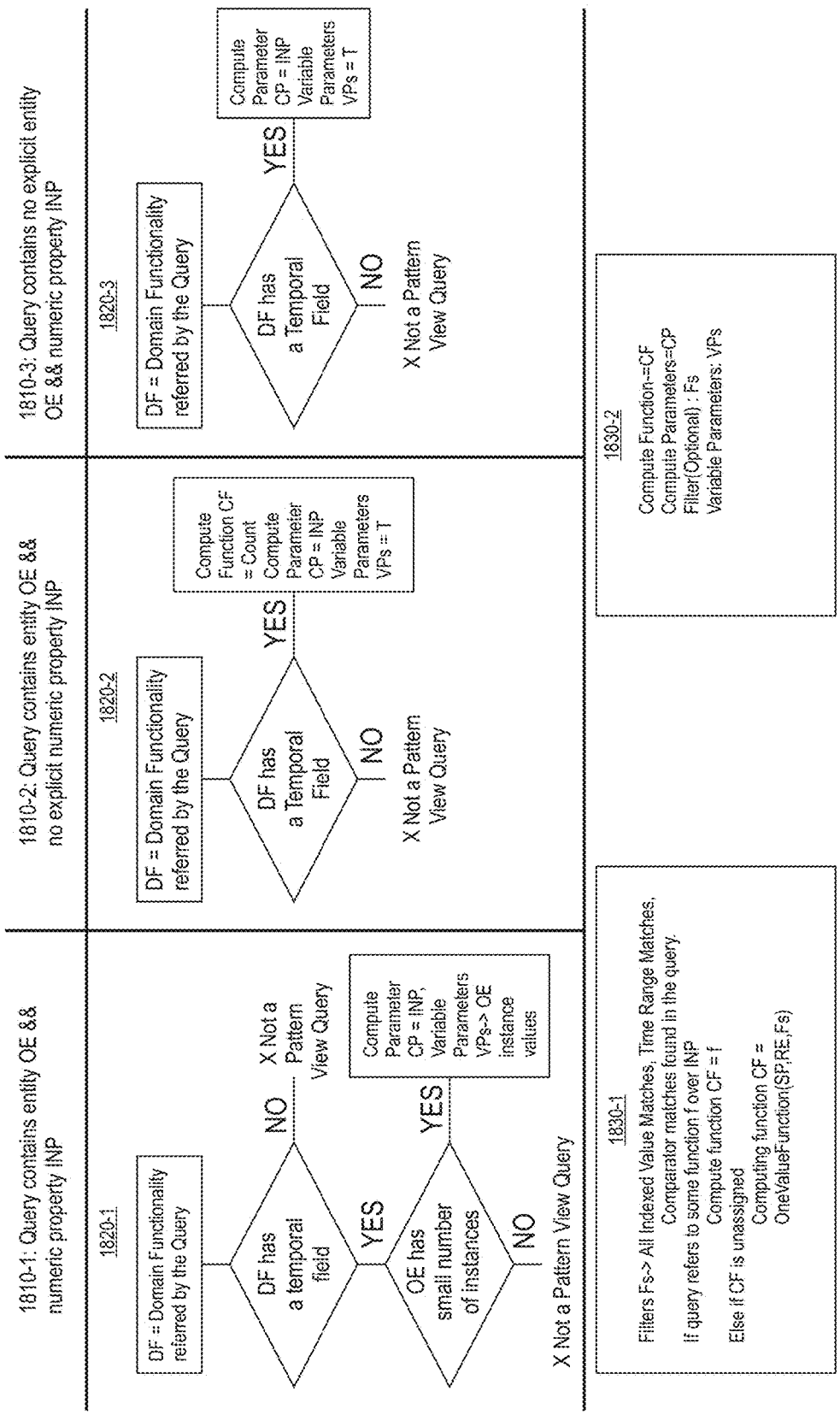

FIG. 18 illustrates exemplary functionality 1800 for reasoning with respect to the exemplary pattern view query class according to one embodiment of the invention. Generally, in one or more embodiments, the exemplary functionality 1800 identifies one set of arguments for a given natural language query that is classified into the pattern view query class.

As shown in FIG. 18, a received natural language query is classified during step 1810 for processing treatment by one of sections 1820-1 through 1820-3, based on whether or not the received natural language query comprises an entity OE (Output Entity) and/or a numeric property NP. In particular, the received natural language query is classified at step 1810-1 when the received natural language query contains an entity OE and a numeric property INP. In addition, the arguments are assigned to the natural language query in section 1820-1, as follows, where DF indicates the domain functionality referred to by the query:

When the domain functionality does not have a temporal field:
the received natural language query is not a pattern view query;
When the domain functionality has a temporal field, and
When the Output Entity has a small number of instances:
Compute Parameter CP=INP,
Variable Parameters VPs→OE instance values.
When the Output Entity does not have a small number of instances:
the received natural language query is not a pattern view query.

The received natural language query is classified at step 1810-2 when the received natural language query contains an entity OE but does not contain an explicit numeric property INP. The arguments are assigned to the natural language query in section 1820-2, as follows, where DF indicates the domain functionality referred to by the query:

When the domain functionality has a temporal field:
Compute Function CF=Count;
Compute Parameter CP=INP; and
Variable Parameters VPs=T.
When the domain functionality does not have a temporal field:
the received natural language query is not a pattern view query.

The received natural language query is classified at step 1810-3 when the received natural language query does not contain an explicit entity OE but contains a numeric property INP. The arguments are assigned to the natural language query in section 1820-3, as follows, where DF indicates the domain functionality referred to by the query:

When the domain functionality has a temporal field:
Compute Parameter CP=INP; and
Variable Parameters VPs=T.
When the domain functionality does not have a temporal field:
the received natural language query is not a pattern view query.

As shown in FIG. 18, the domain reasoning 1800 further comprises functionality 1830-1 that specifies how to use the Compute Function populated in section 1820. The exemplary functionality 1830-1 specifies the Compute Function as follows:

Filters Fs→All Indexed Value Matches, Time Range Matches,
Comparator matches found in the query.
If query refers to some function f over INP
Compute function CF=f
Else, if CF is unassigned:
Computing function CF= OneValueFunction(SP,RE,Fs).

In addition, section 1830-2 specifies the following functionality for pattern view queries:

Compute Function=CF;
Compute Parameters=CP;
Filter(Optional): Fs; and
Variable Parameters: VPs.

Figure 19:
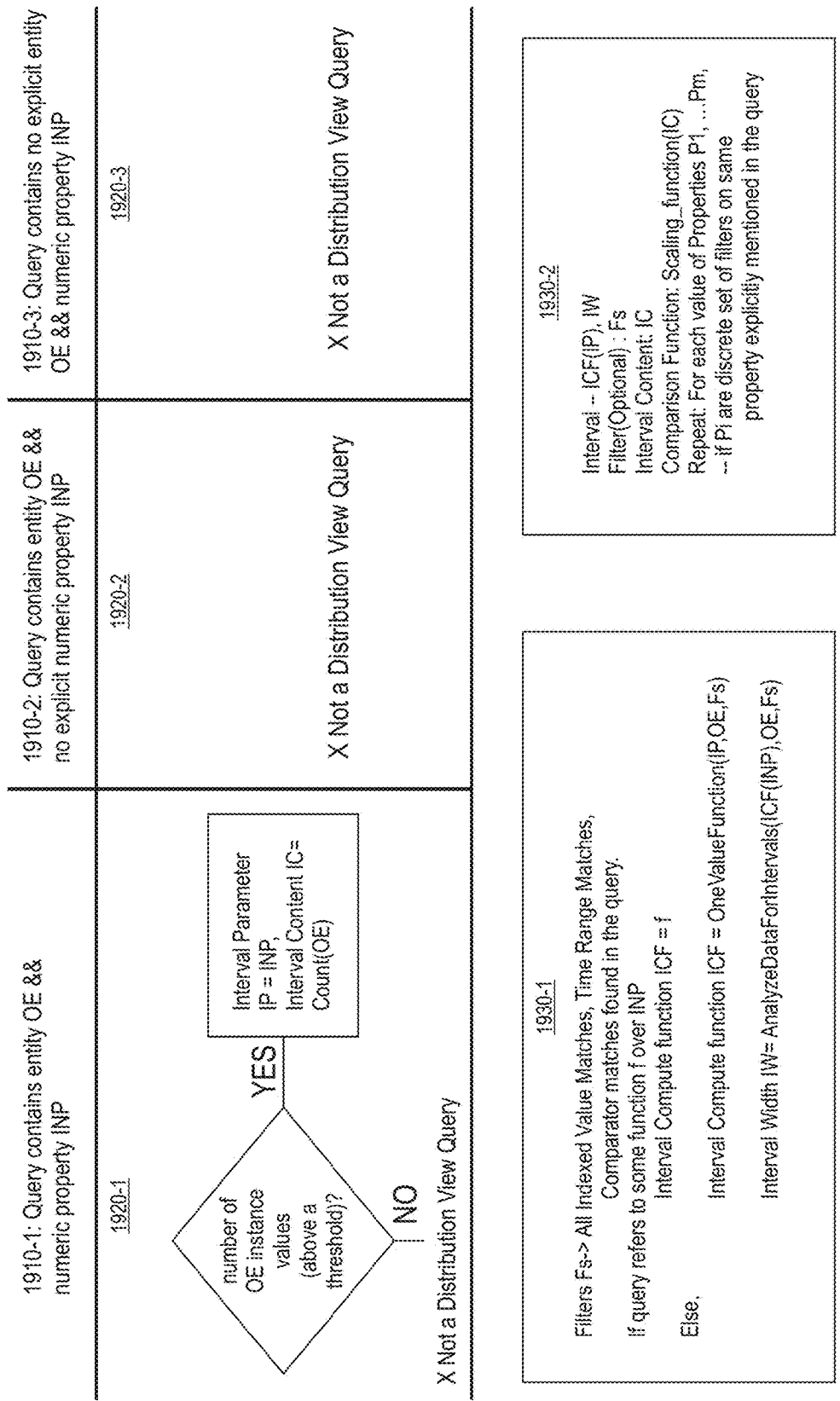

FIG. 19 illustrates exemplary functionality 1900 for reasoning with respect to the exemplary distribution view query class according to one embodiment of the invention. Generally, in one or more embodiments, the exemplary functionality 1900 identifies one set of arguments for a given natural language query that is classified into the distribution view query class.

As shown in FIG. 19, a received natural language query is classified during step 1910 for processing treatment by one of sections 1920-1 through 1920-3, based on whether or not the received natural language query comprises an entity OE (Output Entity) and/or a numeric property INP. In particular, the received natural language query is classified at step 1910-1 when the received natural language query contains an entity OE and a numeric property INP. In addition, the arguments are assigned to the natural language query in section 1920-1, as follows:

When the number of OE instance values is above a threshold:
Interval Parameter IP=INP; and
Interval Content IC=Count(OE).
When the number of OE instance values is not above the threshold:
the received natural language query is not a distribution view query.

The received natural language query is classified at step 1910-2 when the received natural language query contains an entity OE but does not contain an explicit numeric property INP. Arguments are not assigned to the natural language query in section 1920-2, however, since the received natural language query is not a distribution view query.

The received natural language query is classified at step 1910-3 when the received natural language query does not contain an explicit entity OE but contains a numeric property INP. Arguments are not assigned to the natural language query in section 1920-3, however, since the received natural language query is not a distribution view query.

As shown in FIG. 19, the domain reasoning 1900 further comprises functionality 1930-1 that specifies how to use the Compute Function populated in section 1920. The exemplary functionality 1930-1 specifies the Compute Function as follows:

Filters Fs→All Indexed Value Matches, Time Range Matches.
Comparator matches found in the query.
If query refers to some function f over INP
Interval Compute function ICF=f
Else,
Interval Compute function ICF=
    OneValueFunction(IP,OE,Fs);
Interval Width IW=AnalyzeDataForIntervals(ICF(INP), OE,Fs).

In addition, section 1930-2 specifies the following functionality for distribution view queries:

Interval—ICF(IP),IW:
Filter(Optional): Fs;
Interval Content: IC;
Comparison Function: Scaling_function(IC);
Repeat: For each value of Properties P1, . . . Pm,
if Pi are discrete set of filters on same property
explicitly mentioned in the query.

FIG. 20 illustrates an exemplary set of additional domain examples 2000 according to one embodiment of the invention. For each example natural language query 2010 shown in FIG. 20, domain reasoning/data analysis 2020 is performed to assign class parameters 2030 to the example natural language query 2010.

For the example query 2010-1 of "How has Apple's stock performed under Tim Cook, as compared to its competitors?" the domain reasoning/data analysis 2020 suggests that in the query 2010-1 "relation between company and executive has a temporal association, as "under Tim Cook" refers to a temporal field." Thus, the following exemplary class parameters 2030 are assigned to the query 2010-1:

Pattern Query;
PointValue(Stock.value);
Filter: Apple, Tim Cook, Time duration for Tim Cook. Apple's Competitor;
Variable: Stock.Year, Stock.Company; and
Implicit: Tim Cook's duration as the variable time points.

For the example query 2010-2 of "In which countries are most groceries bought online?" the domain reasoning/data analysis 2020 suggests that in the query 2010-2, "'Grocery' is Related With a Measurable Quantity "Price"." Thus, the following exemplary class parameters 2030 are assigned to the query 2010-2:

Rank Query;
Rank(Country C);
Filter: Grocery, Online;
Score: Sum(C.Price);
Score Comparison Function: %;
Repeat: None; and
Implicit Inference: Sum on Price.

For the example query 2010-3 of "How much time do primary care physicians spend with patients as of 2017?" the domain reasoning/data analysis 2020 suggests that in the query 2010-3, "'Time' is a Measurable Quantity; Data Analysis can Reveal How to Bucketize the Time Values." Thus, the following exemplary class parameters 2030 are assigned to the query 2010-3:

Distribution Query;
Interval (Spent Time);
Filter: Primary Care Physician, 2017;
Count: Spent Time→Doctors; and
Repeat: None.

An embodiment of the invention or elements thereof can be implemented in the form of an apparatus including a memory and at least one processor that is coupled to the memory and configured to perform exemplary method steps.

Figure 21:
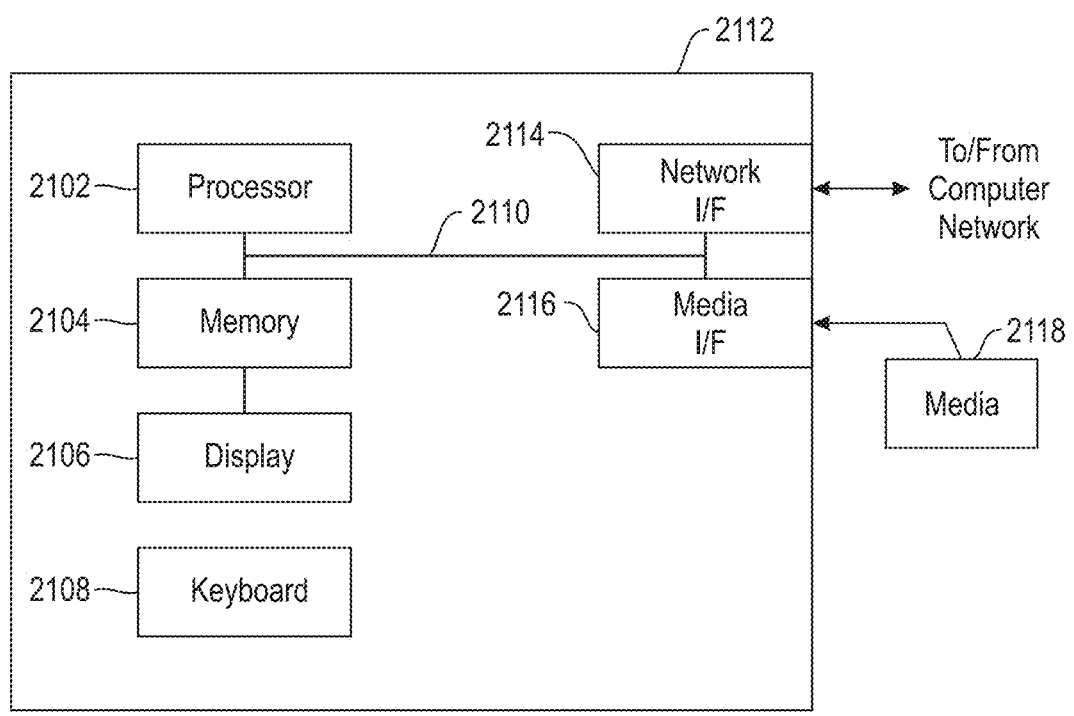
FIG. 21 is a system diagram of an exemplary computer system on which at least one embodiment of the invention can be implemented.

Additionally, an embodiment of the present invention can make use of software running on a computer or workstation. With reference to FIG. 21, such an implementation might employ, for example, a processor 2102, a memory 2104, and an input/output interface formed, for example, by a display 2106 and a keyboard 2108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 2102, memory 2104, and input/output interface such as display 2106 and keyboard 2108 can be interconnected, for example, via bus 2110 as part of a data processing unit 2112. Suitable interconnections, for example via bus 2110, can also be provided to a network interface 2114, such as a network card, which can be provided to interface with a computer network, and to a media interface 2116, such as a diskette or CD-ROM drive, which can be provided to interface with media 2118.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 2102 coupled directly or indirectly to memory elements 2104 through a system bus 2110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 2108, displays 2106, pointing devices, and the like) can be coupled to the system either directly (such as via bus 2110) or through intervening I/O controllers (omitted for clarity).

Network adapters such as network interface 2114 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 2112 as shown in FIG. 21) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 2102. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 22:
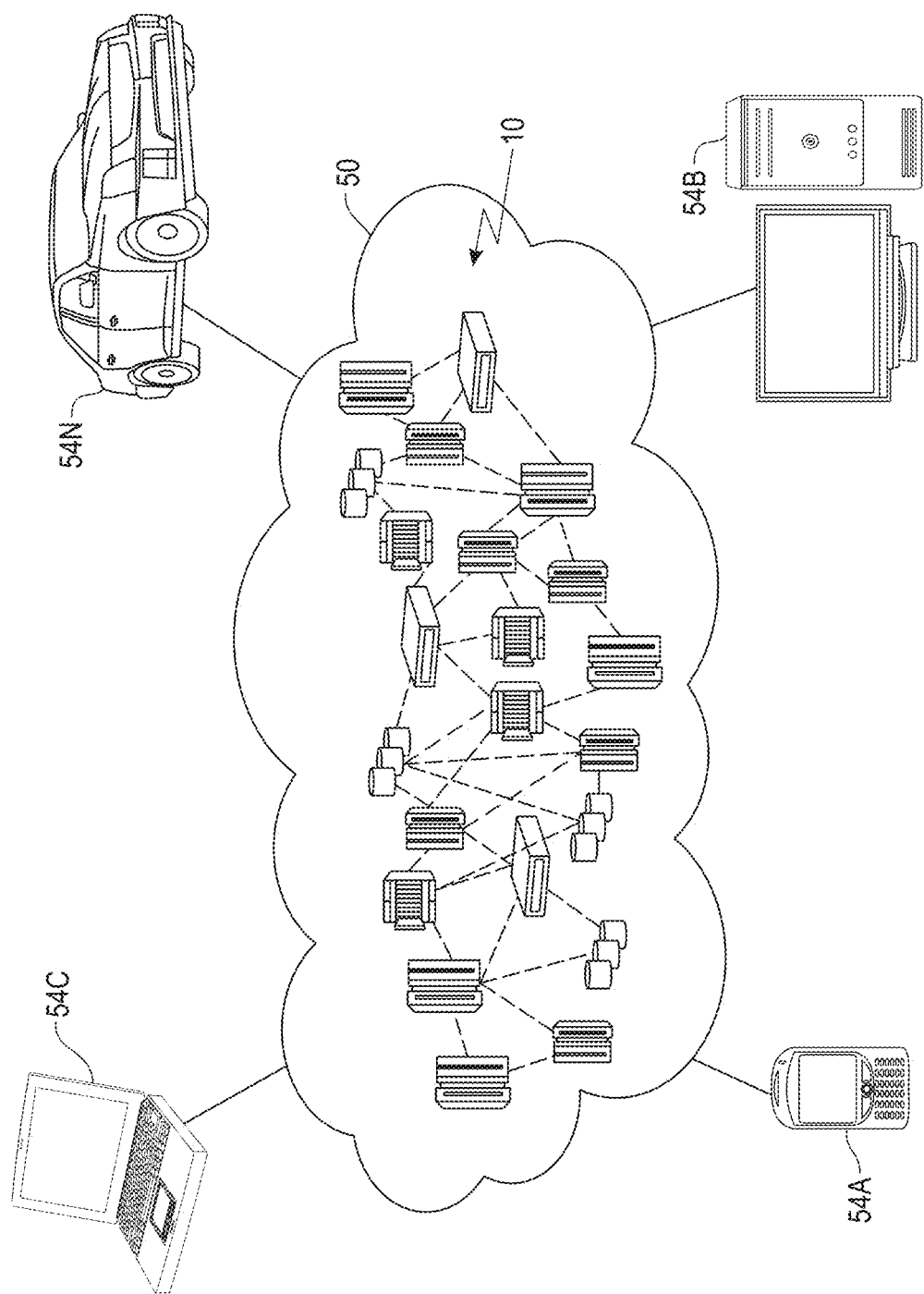
FIG. 22 depicts a cloud computing environment according to an embodiment of the present invention.

Referring now to FIG. 22, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 22 are intended to be illustrative only and that computing nodes 10 and cloud computing environment 50 can communicate with any type of computerized device over any type of network and/or network addressable connection (e.g., using a web browser).

Figure 23:
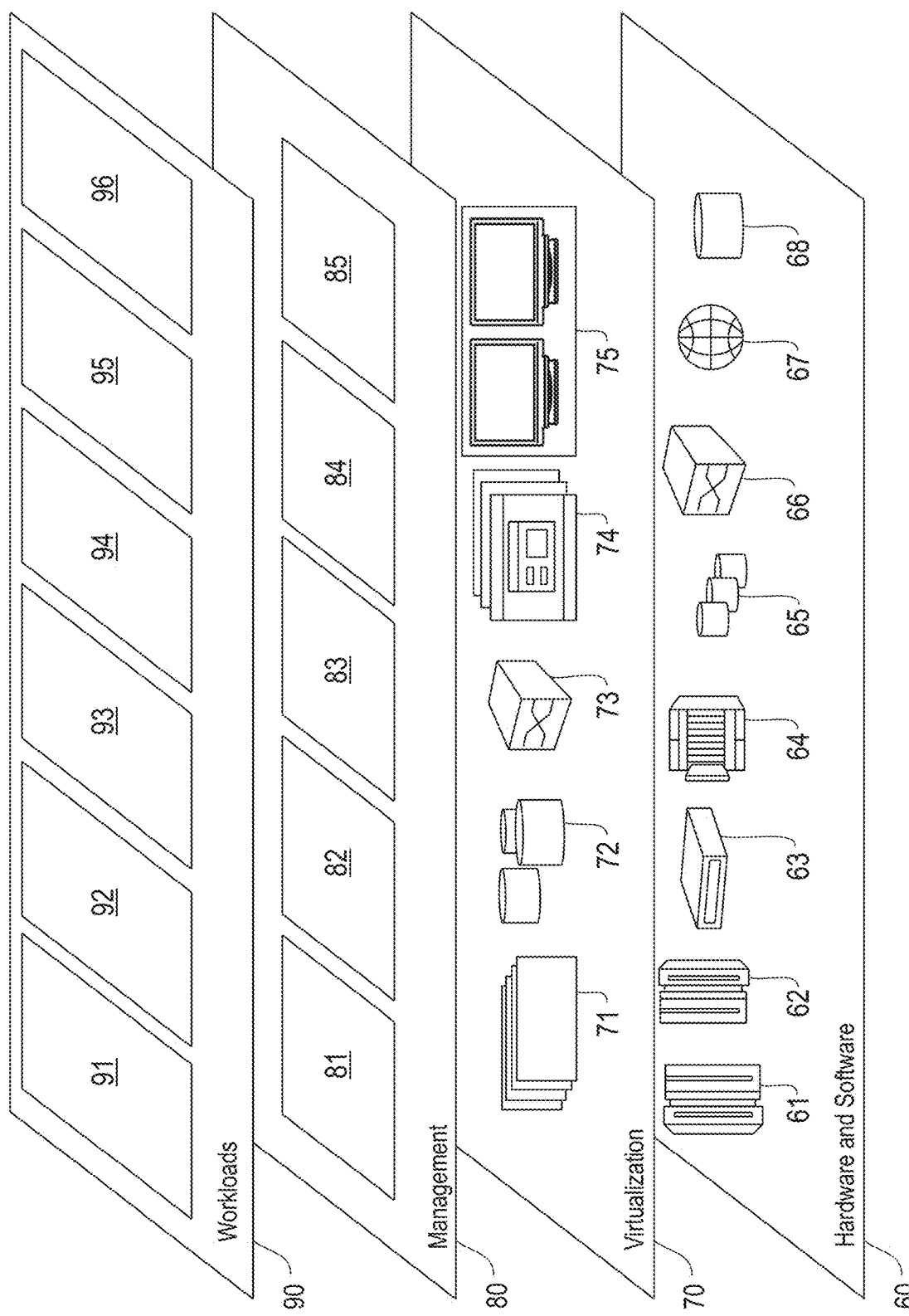
FIG. 23 depicts abstraction model layers according to an embodiment of the present invention.

Referring now to FIG. 23, a set of functional abstraction layers provided by cloud computing environment 50 (FIG. 22) is shown. It should be understood in advance that the components, layers, and functions shown in FIG. 23 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language query processing 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, processing natural language queries comprising an express or implied analytics intent.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining a natural language query comprising at least one analytics function;
    applying domain reasoning, using at least one grammar for one or more categories of analytics functions, to assign the at least one analytics function of the natural language query into a given analytics function category;
    identifying one or more arguments and a sequence of one or more actions associated with the given analytics function category;
    instantiating, using at least one processing device, the at least one analytics function using the one or more arguments and the sequence of one or more actions;
    interpreting, using the at least one processing device, the instantiated at least one analytics function in the context of at least one domain ontology to generate at least one target executable query to implement the instantiated at least one analytics function; and
    executing, using the at least one processing device, the sequence of one or more actions for the given analytics function category on a result of the at least one target executable query to obtain at least one answer to the natural language query.

2. The computer-implemented method of claim 1, wherein said applying the domain reasoning comprises applying one or more of (i) keyword rules and (ii) pattern matching rules to the natural language query to classify the at least one analytics function of the natural language query into the given analytics function category.

3. The computer-implemented method of claim 1, wherein said identifying comprises obtaining the one or more arguments and the sequence of one or more actions specified for the given analytics function category.

4. The computer-implemented method of claim 1, comprising:
classifying the natural language query as one or more of (i) a query that comprises the at least one analytics function, a query that does not specify an analytics intent, and (iii) a query that specifies an analytics intent.

5. The computer-implemented method of claim 4, wherein the method is performed when the natural language query is classified as a query that comprises the at least one analytics function.

6. The computer-implemented method of claim 1, wherein the one or more categories of analytics functions comprises at least one of: a percentage computation analytics function category, a growth/decline query analytics function category, a difference query analytics function category, a compare query analytics function category, a statistical functions analytics function category, and a combination of such categories.

7. The computer-implemented method of claim 1, wherein the one or more categories of analytics functions comprise two or more of: a percentage computation analytics function category, a growth/decline query analytics function category, a difference query analytics function category, a compare query analytics function category, a statistical functions analytics function category, and a combination of such categories.

8. A computer program product comprising a computer readable storage medium having program instructions embodied therewith, the program instructions executable by a computing device to cause the computing device to:
obtain a natural language query comprising at least one analytics function;
apply domain reasoning, using at least one grammar for one or more categories of analytics functions, to assign the at least one analytics function of the natural language query into a given analytics function category;
identify one or more arguments and a sequence of one or more actions associated with the given analytics function category;
instantiate, using at least one processing device, the at least one analytics function using the one or more arguments and the sequence of one or more actions;
interpret, using the at least one processing device, the instantiated at least one analytics function in the context of at least one domain ontology to generate at least one target executable query to implement the instantiated at least one analytics function; and
execute, using the at least one processing device, the sequence of one or more actions for the given analytics function category on a result of the at least one target executable query to obtain at least one answer to the natural language query.

9. The computer program product of claim 8, wherein said applying the domain reasoning comprises applying one or more of (i) keyword rules and (ii) pattern matching rules to the natural language query to classify the at least one analytics function of the natural language query into the given analytics function category.

10. The computer program product of claim 8, wherein said identifying comprises obtaining the one or more arguments and the sequence of one or more actions specified for the given analytics function category.

11. The computer program product of claim 8, wherein the program instructions executable by the computing device further cause the computing device to:
classify the natural language query as one or more of (i) a query that comprises the at least one analytics function, (ii) a query that does not specify an analytics intent, and (iii) a query that specifies an analytics intent.

12. The computer program product of claim 11, wherein the steps are performed when the natural language query is classified as a query that comprises the at least one analytics function.

13. The computer program product of claim 8, wherein the one or more categories of analytics functions comprises at least one of: a percentage computation analytics function category, a growth/decline query analytics function category, a difference query analytics function category, a compare query analytics function category, a statistical functions analytics function category, and a combination of such categories.

14. The computer program product of claim 8, wherein the one or more categories of analytics functions comprise two or more of: a percentage computation analytics function category, a growth/decline query analytics function category, a difference query analytics function category, a compare query analytics function category, a statistical functions analytics function category, and a combination of such categories.

15. A system comprising:
a memory; and
at least one processor coupled to the memory and configured to:
obtain a natural language query comprising at least one analytics function;
apply domain reasoning, using at least one grammar for one or more categories of analytics functions, to assign the at least one analytics function of the natural language query into a given analytics function category;
identify one or more arguments and a sequence of one or more actions associated with the given analytics function category;
instantiate, using at least one processing device, the at least one analytics function using the one or more arguments and the sequence of one or more actions;
interpret, using the at least one processing device, the instantiated at least one analytics function in the context of at least one domain ontology to generate at least one target executable query to implement the instantiated at least one analytics function; and
execute, using the at least one processing device, the sequence of one or more actions for the given analytics function category on a result of the at least one target executable query to obtain at least one answer to the natural language query.

16. The system of claim 15, wherein said applying the domain reasoning comprises applying one or more of (i) keyword rules and (ii) pattern matching rules to the natural language query to classify the at least one analytics function of the natural language query into the given analytics function category.

17. The system of claim 15, wherein said identifying comprises obtaining the one or more arguments and the sequence of one or more actions specified for the given analytics function category.

18. The system of claim 15, wherein the at least one processor is further configured to:
classify the natural language query as one or more of (i) a query that comprises the at least one analytics function, (ii) a query that does not specify an analytics intent, and (iii) a query that specifies an analytics intent.

19. The system of claim 18, wherein the steps are performed when the natural language query is classified as a query that comprises the at least one analytics function.

20. The system of claim 15, wherein the one or more categories of analytics functions comprises at least one of: a percentage computation analytics function category, a growth/decline query analytics function category, a difference query analytics function category, a compare query analytics function category, a statistical functions analytics function category, and a combination of such categories.

* * * * *